(12) United States Patent
Blom et al.

(10) Patent No.: US 7,474,230 B2
(45) Date of Patent: Jan. 6, 2009

(54) RFID TEMPERATURE LOGGER INCORPORATING A FREQUENCY RATIO DIGITIZING TEMPERATURE SENSOR

(75) Inventors: Eric D. Blom, Wakefield, MA (US); Jun Wan, Wilmington, MA (US); Stuart H. Urie, Milford, NH (US)

(73) Assignee: National Semiconductor Corporation, Santa Clara, CA (US)

( * ) Notice: Subject to any disclaimer, the term of this patent is extended or adjusted under 35 U.S.C. 154(b) by 171 days.

(21) Appl. No.: 11/425,381

(22) Filed: Jun. 20, 2006
(Under 37 CFR 1.47)

(65) Prior Publication Data
US 2007/0205916 A1    Sep. 6, 2007

Related U.S. Application Data

(63) Continuation-in-part of application No. 11/361,912, filed on Feb. 23, 2006, now Pat. No. 7,331,708.

(51) Int. Cl.
*G08C 17/00* (2006.01)

(52) U.S. Cl. .......................... 340/870.04; 340/870.17; 340/539.22

(58) Field of Classification Search ............ 340/539.22, 340/572.1, 870.17, 870.04; 374/172, 170
See application file for complete search history.

(56) References Cited

U.S. PATENT DOCUMENTS

| | | | |
|---|---|---|---|
| 4,409,628 A * | 10/1983 | Frimet et al. ............. | 360/73.09 |
| 5,388,134 A | 2/1995 | Douglass et al. | |
| 5,513,235 A | 4/1996 | Douglass et al. | |
| 5,638,418 A | 6/1997 | Douglass et al. | |
| 5,899,570 A | 5/1999 | Darmawaskita et al. | |
| 6,020,792 A | 2/2000 | Nolan et al. | |
| 6,052,035 A | 4/2000 | Nolan et al. | |
| 6,078,208 A | 6/2000 | Nolan et al. | |
| 6,115,441 A | 9/2000 | Douglass et al. | |
| 6,183,131 B1 | 2/2001 | Holloway et al. | |
| 6,356,161 B1 | 3/2002 | Nolan et al. | |

(Continued)

OTHER PUBLICATIONS

Tom Kevan, "Control of the Cold Chain—Systems tap RFID and sensors to deliver greater visibility and improved record-keeping," Alien Technology publication, reprinted from Frontline Solutions, Mar. 2005, www.frontlinetoday.com, 4 pages.

*Primary Examiner*—Albert K Wong
*Assistant Examiner*—Hung Q Dang
(74) *Attorney, Agent, or Firm*—Patent Law Group LLP; Carmen C. Cook

(57) ABSTRACT

A semi-passive radio frequency identification (RFID) tag being coupled to a battery providing a battery voltage for powering a part of the circuitry of the RFID tag includes an RF communication block receiving and transmitting RF signals, a sensor block including a frequency ratio digitizing temperature sensor for alternately measuring the ambient temperature and the battery voltage, and a control logic block in communication with the RF communication block and the sensor block. The control logic controls the operation of the RF communication block and the sensor block and stores temperature and voltage measurement data generated by the sensor block. In one embodiment, the control logic block of the RFID tag operates based on a system clock and the sensor block provides a reference clock to the control logic block for use in calibrating the system clock of the control logic block.

18 Claims, 15 Drawing Sheets

U.S. PATENT DOCUMENTS 6,563,417 B1 5/2003 Shaw
6,917,291 B2 7/2005 Allen
2006/0139168 A1* 6/2006 Pratt et al. ............. 340/539.22
2007/0001856 A1* 1/2007 Diorio et al. ............. 340/572.1

* cited by examiner

FIG. 15A1

# RFID TEMPERATURE LOGGER INCORPORATING A FREQUENCY RATIO DIGITIZING TEMPERATURE SENSOR

CROSS-REFERENCE TO RELATED APPLICATIONS

This application is a continuation-in-part of application Ser. No. 11/361,912, filed Feb. 23, 2006, entitled "Frequency Ratio Digitizing Temperature Sensor With Linearity Correction" of the same inventors hereof, which application is incorporated herein by reference in its entirety.

FIELD OF THE INVENTION

The invention relates to a radio frequency identification device and, in particular, to a radio frequency identification device incorporating a frequency ratio digitizing temperature sensor.

DESCRIPTION OF THE RELATED ART

Radio Frequency Identification (RFID) refers to automatic identification technologies that use radio waves to automatically identify people or objects. REID encompasses a variety of identification methods where the most common is to store a serial number that identifies a person or object, and perhaps other information, on a microchip that is attached to an antenna. The microchip and the antenna together are called an RFID transponder or an RFID tag. The silicon chip and the antenna work in conjunction to enable the RFID tag to receive and respond to radio-frequency queries from an RFID reader or transceiver. For instance, the antenna enables the chip to transmit the identification information to the RFID reader. The reader converts the radio waves reflected back from the RFID tag into digital information that can then be passed on to computers that can make use of the identification information.

RFID tags can be either passive, semi-passive (also known as semi-active), or active. Passive RFID tags require no internal power source but instead draw power from the electromagnetic field created by the transceiver or reader and use that power to supply the microchip's circuits. The electromagnetic waves from the RFID transceiver or reader induce a current in the RFID tag's antenna. The chip then modulates the waves that the antenna sends back to the transceiver. The transceiver than converts the new waves into digital data.

Active RFID tags require an internal power source, such as a battery, which is used to power the microchip and generate the outgoing signal. Active RFID tags are sometimes referred to as beacons as they are capable of broadcasting their own signals.

Semi-passive RFID tags are similar to passive tags with the exception of a small battery used to power the microchip's circuitry. The RFID tag still communicates by drawing power from the reader or transceiver. The battery allows the microchip of the tag to be constantly powered, which removes the need for the aerial to be designed to collect power from the incoming signal. Aerials can therefore be optimized for the backscattering signal. Semi-passive RFID tags are faster in response and therefore stronger in reading ratio compared to passive tags.

One common application of RFID technology is for tracking of goods moving through a supply chain. Furthermore, RFID tags have been combined with sensors that detect and record temperature, movement and even radiation. In this manner, the same RFID tags used to track items moving through the supply chain may operate to alert the staff if the goods are not stored at the right temperature or if someone has injected a biological agent into goods.

Microchips in RFID tags can be read-write, read-only or "write once, read many" (WORM). With read-write chips, information can be added to the tag or existing information can be overwritten, except for the identification serial number. The RFID tag may include additional storage blocks for storing information gathered by the tag itself.

An improved RFID tag with temperature logging ability is desired.

Frequency ratio digitizing temperature sensors operating to measure temperature by changing the frequency of an oscillator are well known. More generally, such a temperature sensor is implemented using a frequency ratio analog-to-digital converter (ADC) to measure an input signal that varies with temperature. In general, a frequency ratio digitizing temperature sensor includes two oscillators—a reference oscillator and a data oscillator. The reference oscillator defines the conversion interval where a fixed number of clock periods of the reference frequency is used to indicate the conversion period. The frequency of the data oscillator, the data frequency, is varied with temperature and the ratio of the data frequency to the reference frequency forms the digital output signal of the temperature sensor.

In conventional frequency ratio digitizing temperature sensors, non-ideal characteristics of the various elements of the sensor circuit result in non-linearity of the digital output signals. For instance, the reference oscillator and the data oscillator in a frequency ratio digitizing temperature sensor are generally implemented using current-to-frequency converters (I/F converters). Propagation delays through the oscillators result in distortion of the linearity of the frequency of the digital output signal. Also, the temperature dependent currents generated to indicate temperature measurement and/ or for use as reference currents may themselves exhibit non-linear characteristics. The temperature coefficients of the resistors and capacitors forming each oscillator may cause additional drifts and nonlinearity in the oscillator frequency as temperature changes.

Some prior art solutions to correcting or minimizing the linearity errors force the corrected system to be less useful in common applications. For example, some temperature frequency ratio analog-to-digital converters (ADCs) use a reference oscillator where the reference frequency intentionally varies widely with temperature. Typically, this type of frequency ratio ADCs uses a reference oscillator whose frequency decreases with increasing temperature, while the data frequency remains relatively constant. This results in a conversion time which increases significantly as the temperature increases, which can be inconvenient when the desired application is an output stream of samples taken at fixed, constant intervals.

Temperature digitizing frequency ratio ADCs have also been designed and fabricated with a temperature compensated crystal oscillator as the reference frequency generator. However, the crystal oscillator is an external component and the use of a crystal oscillator increases the cost as well as the circuit area required for implementing the frequency ratio ADC.

In U.S. Pat. No. 6,183,131, a digitizing temperature sensor implements linearity correction by adding a small fraction of the ADC input (a PTAT signal) to the (nearly constant) ADC reference signal. In this manner, nearly perfect correction of bow errors is observed in these digitizing temperature sensors, especially those errors related to the temperature dependent behavior of the base-to-emitter voltage. However, the linearity correction described in the '131 patent applies only to a digital temperature sensor which utilizes an ADC with a single input and a single reference port. It does not apply to frequency ratio ADCs in part because frequency ratio ADCs use four distinct input ports and linearity correction for signal input and reference port is not directly applicable.

BRIEF DESCRIPTION OF THE DRAWINGS

FIG. 15, which includes FIGS. 15(a), 15(b), 15(c) and 15A1, is a schematic diagram of a current-to-frequency converter which can be used to implement the I/F converters in the frequency ratio digitizing temperature sensor of the present invention.

DETAILED DESCRIPTION OF THE PREFERRED EMBODIMENTS

Figure 1:
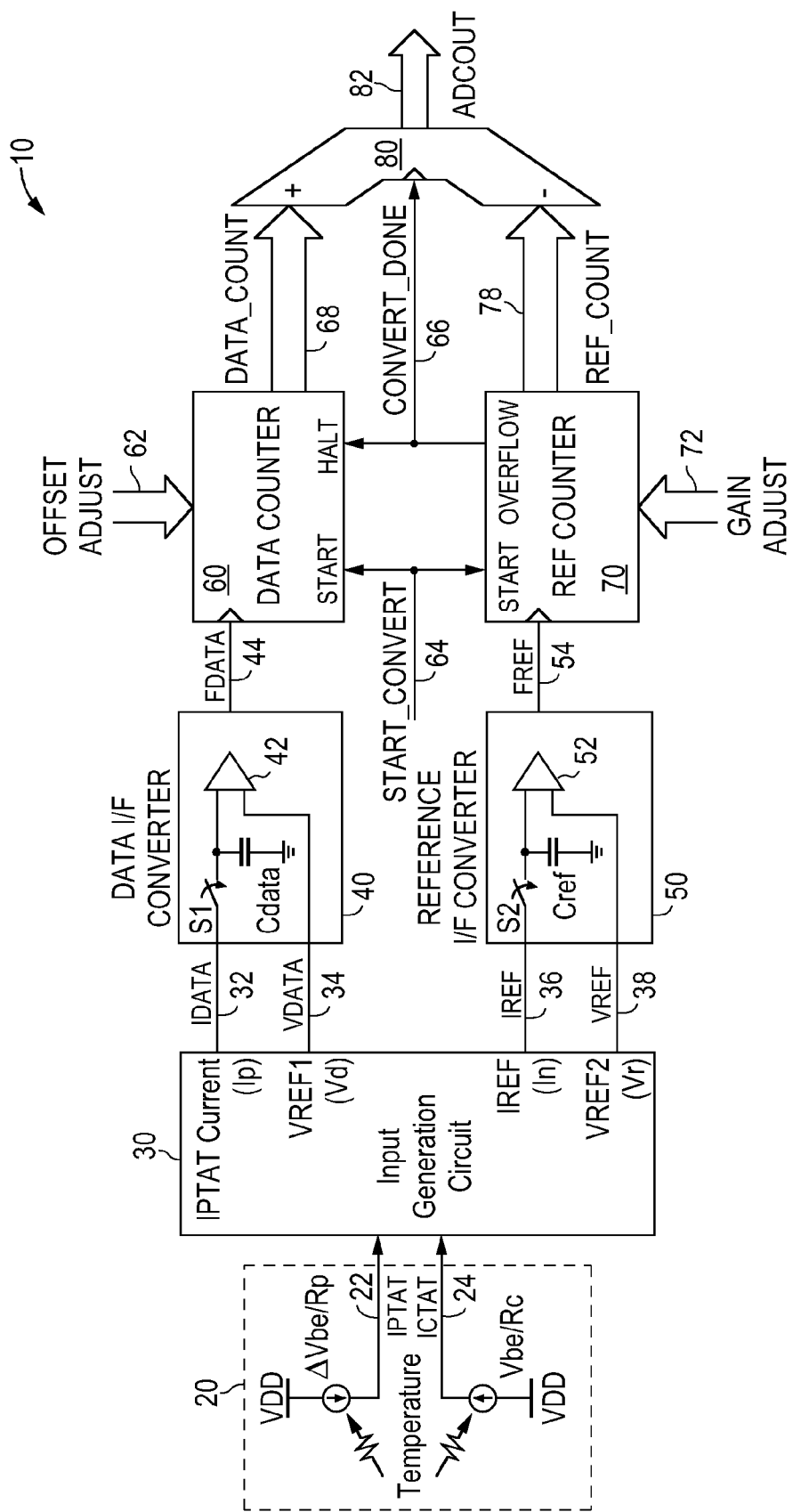
FIG. 1 is a schematic diagram of a frequency ratio digitizing temperature sensor according to one embodiment of the present invention.

In accordance with the principles of the present invention, a frequency ratio digitizing temperature sensor including a reference oscillator and a data oscillator implements linearity correction by adding a correction current to a temperature-independent reference current and using identical copies of the corrected reference current to drive both the reference oscillator current input and a resistor at the data oscillator reference voltage input. The resistor converts the current to a corrected reference voltage, which reference voltage is inversely proportional to the frequency at the reference oscillator output. The correction current is a current proportional to absolute temperature (a PTAT current) and is obtained by choosing a duplicated fractional portion Kp of the PTAT current applied to the input generation circuit from the temperature sensing current sources. As a result of using the corrected reference current to drive the reference oscillator, the reference frequency of the temperature sensor is intentionally made to exhibit errors over temperature. As a result of using the corrected reference current to generate the voltage reference at the data oscillator, the frequency at the data oscillator output is also intentionally induced to exhibit inverse frequency errors. The nature of these frequency errors has the effect of canceling the linearity errors in the digital temperature output over temperature.

The frequency ratio digitizing temperature sensor of the present invention realizes linearity error corrections not achievable in conventional frequency ratio temperature sensors. More specifically, error sources associated with the temperature dependent currents, the time delay in the current-to-frequency converters and the temperature dependent behavior of the resistors and capacitors are simultaneously cancelled when the predetermined amount of PTAT current is added to the reference current.

According to another aspect of the present invention, a radio frequency identification (RFID) tag incorporates the frequency ratio digitizing temperature sensor to form an RFID temperature logger. The RFID tag can be programmed to record temperature data either on command or at specified intervals. In one embodiment, the RFID tag is semi-passive with the temperature sensor and the control circuitry powered by a battery. In a further embodiment, the frequency ratio digitizing temperature sensor of the present invention is configured as a dual function temperature/voltage sensor where the temperature sensor circuitry is used to alternately measure the battery voltage and the ambient temperature. In another embodiment, the 3-port linearity correction method is implemented in the frequency ratio digitizing temperature sensor so that a stable reference clock is generated by the temperature sensor. The stable reference clock is used by the control circuitry of the RFID tag for clock calibration, thereby eliminating the need for an external crystal oscillator. The RFID tag incorporating the frequency ratio digitizing temperature sensor of the present invention will be described in more detail below.

In general, a frequency ratio digitizing temperature sensor includes a pair of current-to-frequency (I/F) converters implementing the reference oscillator and the data oscillator. The pair of I/F converters, referred to as a data I/F converter and a reference I/F converter, each receive two input signals (a current and a voltage) and generate a frequency output signal. The pair of I/F converters thus utilizes four input signals to generate the two frequency output signals for computing the temperature being measured. More specifically, the data I/F converter receives a temperature dependent input current Idata and an approximately temperature independent reference voltage Vdata. The temperature dependent input current Idata is a duplicate copy of the PTAT current IPTAT generated by the difference between the base-to-emitter Vbe voltages of a pair of bipolar transistors in response to a temperature stimulus. The reference I/F converter receives an approximately temperature independent reference current Iref and an approximately temperature independent reference voltage Vref.

According to one aspect of the present invention, the frequency ratio digitizing temperature sensor of the present invention implements a 2-port linearity correction method. In the 2-port linearity correction method, two of the four input signals to the I/F converters are corrected by the correction current. Specifically, a corrected reference current is formed by adding a small fraction of the temperature dependent PTAT current to a reference current that is first order temperature stable. Identical copies of the corrected reference current are simultaneously applied as the reference current to the reference I/F converter and, through a resistor, as the reference voltage Vdata for the data I/F converter.

The simultaneous application of two identical copies of the corrected reference current to the input signals of both the data and reference I/F converters modifies the transfer function of the frequency ratio analog-to-digital converter (ADC) such that second order distortion is generated within the ADC which is of opposite sign from the second order distortion inherent in the temperature dependent currents generated using bipolar transistor based temperature sensors. As a result, the linearity error of the digitized temperature measurements is greatly reduced. In one embodiment, at least 20 dB of linearity improvement in the digital temperature measurement is obtained.

According to another aspect of the present invention, the frequency ratio digitizing temperature sensor of the present invention implements a 3-port linearity correction method. In the 3-port linearity correction method, three of the four input signals to the I/F converters are corrected by two separate correction currents. The temperature dependent input current Idata is the only input signal left uncorrected. In the 3-port linearity correction method, a first corrected reference current is applied to the reference current Iref of the reference I/F converter and a duplicate copy of this corrected reference current is applied to a resistor at the Vdata reference voltage input of the data I/F converter in the same manner as in the 2-port linearity correction method. The 3-port linearity correction method involves forming a second corrected reference current by adding a small fraction of the temperature dependent PTAT current to a reference current that is first order temperature stable. The fraction of the PTAT current used to form the second corrected reference current is different from the fraction of the PTAT current used to form the first corrected reference current so that the two corrected reference currents have different current values. The second corrected reference current is applied to a resistor to generate the reference voltage Vref for the reference I/F converter. In this manner, frequency drift of the reference I/F converter, functioning as the reference oscillator, is minimized while the digital temperature measurements of the temperature are linearized as described above. In one embodiment, the 3-port linearity correction method is capable of 20 dB linearity improvement in the digital temperature measurements while holding the stability of the frequency of the reference clock to 0.06% p-p (peak-to-peak).

In the frequency ratio digitizing temperature sensor of the present invention, simultaneous digital adjustment of the gain and offset may be applied to further enhance measurement accuracy when the application demands absolute accuracy. Furthermore, to enhance the performance of the frequency ratio digitizing temperature sensor of the present invention, the data and reference oscillators can be implemented using I/F converters exhibiting a sum of propagation, logic and switching time delays that is constant over temperature and power supply variations.

In one embodiment, the PTAT current is multiplied by correction factors and added to a reference current to form the first and second corrected reference currents that are no longer temperature independent but exhibit a positive slope of about 1.15% over −25 to 85° C. The correction factors are selected mathematically by solving for equations characterizing the digitizing temperature sensor or empirically using measurement of actual integrated circuits.

The linearity corrected frequency ratio digitizing temperature sensor of the present invention is applicable for frequency ratio digitizing temperature sensors where the data frequency increases with increasing temperature in a manner nearly linearly proportional to absolute temperature (PTAT) while the reference frequency remains constant, or relatively constant. The linearity correction method of the present invention is not applicable in digitizing systems where the data frequency does not increase significantly with temperature.

The linearity corrected frequency ratio digitizing temperature sensor of the present invention provides many advantages over conventional temperature sensors. First, the linearity corrected temperature sensor of the present invention, without requiring the use of external crystal components, can provide temperature measurement results as good or better than temperature sensors using a crystal oscillator. The temperature sensor of the present invention thereby reduces manufacturing cost and circuit area for implementation. Furthermore, when the 3-port linearity correction method is applied, the temperature sensor of the present invention provides simultaneously a reference frequency of increased stability. The reference frequency can be used by other circuitry outside of the temperature sensor requiring a stable reference frequency. The temperature sensor of the present invention thus obviates the need for additional oscillator circuits or an external crystal oscillator to provide such a stabilized reference frequency.

FIG. 1 is a schematic diagram of a frequency ratio digitizing temperature sensor according to one embodiment of the present invention. Referring to FIG. 1, a frequency ratio digitizing temperature sensor 10 receives two temperature dependent currents from a temperature sensing circuit 20 as its input signals. Temperature sensing circuit 20 may be or may not be part of digitizing temperature sensor 10. The exact implementation of temperature sensing circuit 20 is not critical to the practice of the present invention as long as two temperature dependent currents, one proportional and one complementary, are generated for the temperature sensor.

In FIG. 1, temperature sensing circuit 20 is illustrated as two current sources providing a current proportional to absolute temperature IPTAT on a node 22 and a current complementary to absolute temperature ICTAT on a node 24 in response to temperature stimuli. Temperature sensing circuit 20 shown in FIG. 1 is symbolic only and is not intended to represent the actual construction of the temperature sensing circuit. Generally, the two temperature dependent currents are generated using two bipolar transistors operated at unequal current densities. The difference in the base-to-emitter voltages of the two bipolar transistors, the ΔVbe voltage, is a voltage proportional to absolute temperature. A PTAT current can be generated from the ΔVbe voltage by imposing the ΔVbe voltage across a resistor (such as resistor Rp). On the other hand, the base-to-emitter voltage of one of the bipolar transistors, the Vbe voltage, is a voltage complementary to absolute temperature. A CTAT current can thus be generated from the Vbe voltage, typically the larger of the two Vbe voltages at the transistor with the higher current density, by imposing this Vbe voltage across a resistor (such as resistor Rc).

Digitizing temperature sensor 10 is formed by an input generation circuit 30 and a frequency ratio analog-to-digital converter (ADC). Input generation circuit 30 receives the two temperature dependent currents IPTAT and ICTAT and generates the necessary input signals for driving the frequency ratio ADC. In the present embodiment, the frequency ratio ADC includes a pair of current-to-frequency (I/F) converters 40 and 50, a pair of counters 60, 70 and a subtract circuit 80. The frequency ratio ADC provides an output signal ADCOUT as the temperature output signal of digitizing temperature sensor 10.

I/F converter 40 is the data I/F converter for receiving the temperature dependent input current Idata (node 32) and an approximately temperature independent reference voltage Vdata (node 34) and generating a frequency output signal Fdata (node 44) having a frequency indicative of the input current which is a PTAT current. I/F converter 50 is the reference I/F converter for receiving an approximately temperature independent reference current Iref (node 36) and an approximately temperature independent reference voltage Vref (node 38) and generating a frequency output signal Fref (node 54) being the reference frequency of the temperature sensor. The reference frequency Fref defines the conversion period where a fixed number of clock periods, Nc, of the reference frequency indicates the conversion period.

In accordance with the present invention, input generation circuit 30 generates a first corrected reference current to be used to generate the reference voltage Vdata (node 34) and also a duplicate copy of the first corrected reference current to be used as the reference current Iref (node 36). By applying the first corrected reference current in this manner, linearity errors in the final temperature output signals of the temperature sensor are precisely corrected. Furthermore, accordingly to another aspect of the present invention, input generation circuit 30 generates a second corrected reference current to be used to generate the reference voltage Vref (node 38) for improving the stability of the reference frequency Fref. The detail implementation of input generation circuit 30 will be described in more detail below.

In digitizing temperature sensor 10, the reference frequency Fref (node 54) is coupled to reference counter 70 for counting a fixed number, Nc, of clock periods of the reference frequency. Reference counter 70 generates an output signal REF_COUNT on an output terminal 78 indicative of the count Nc which defines the conversion period of the temperature sensor. Reference counter 70 receives a START_CONVERT signal (node 64) to initiate each conversion cycle. When the fixed number of counts Nc has been reached, reference counter 70 generates an overflow signal which functions as a CONVERT_DONE signal (node 66) to indicate the end of each conversion cycle. When reference counter 70 detects a count exceeding the number Nc, the overflow signal will be asserted to indicate end of the conversion period. Reference counter 70 also receives a gain adjust input signal on a terminal 72 for adjusting digitally the gain of digitizing temperature sensor 10. The gain adjust input signal operates to increase or decrease the conversion period by increasing or decreasing the number of counts Nc so as to adjust the gain of the temperature sensor system.

The data frequency Fdata (node 44) is coupled to data counter 60 for counting the number of clock periods of the data frequency within a conversion period of the temperature sensor. Data counter 60 generates an output signal DATA_COUNT on an output terminal 68 indicative of the count of the data frequency within the conversion period. Data counter 60 receives the START_CONVERT signal (node 64) to initiate each conversion cycle. Data counter 60 also receives the CONVERT_DONE signal (node 66) from the reference counter 70 as the Halt signal. When the CONVERT_DONE signal is asserted, counting at the data counter 60 is halted. Finally, data counter 60 receives an offset adjust input signal on a temperature 62 for adjusting digitally the offset of digitizing temperature sensor 10.

In the present embodiment, the DATA_COUNT signal (node 68) and the REF_COUNT signal (node 78) are coupled to subtract circuit 80 where the REF_COUNT signal is subtracted from the DATA_COUNT signal. A final ADCOUT signal on an output terminal 82 is provided as the digital temperature output signal and can be processed to provide a temperature output signal. The circuit and method for processing the ADCOUT signal is well known and is not shown or described in the present description. In one embodiment, digitizing temperature sensor 10 is normalized by selecting a reference frequency and a data frequency that are nominally equal at 0° C. Any inaccuracy in the actual temperature where Fdata=Fref can be corrected digitally by applying the appropriate digital value at the Offset_Adjust input (node 62). In this manner, the subtraction operation will result in a ADCOUT signal that nominally indicates a temperature measurement in degrees Celsius.

In general, the digitized output signal of a frequency ratio ADC, assuming an offset adjust value of zero, is given as follows:

$$ADC_{out} = N_c \left( \frac{F_{data}}{F_{ref}} - 1 \right), \qquad \text{Eq. (1)}$$

where Nc is the fixed number of clock periods of the reference clock and defines the conversion period. Frequency ratio digitizing temperature sensor 10 of the present invention can also be described by Equation (1) above.

If the reference frequency Fref is assumed constant in Equation 1, the ratio Fdata/Fref can be interpreted as some input signal value above which the output signal ADCOUT will range above zero. Thus, any positive output value of the frequency ratio ADC described by Equation 1 corresponds to a magnitude of input signal above some predetermined reference value. Thus the ADC measures the difference between a predetermined positive reference value and the input value. This feature of the frequency ratio ADC is especially useful in diode-based temperature sensing ADCs because the input signal may not reach zero until near −273.15° C., which is far below normal operating temperatures. Thus, the frequency ratio ADC can be normalized by choosing a nominal value for the reference value corresponding to a sensed temperature of 0° C. When thus normalized, a frequency ratio temperature sensor whose digital output signal nominally indicates temperature in degrees Celsius can be constructed.

In the present embodiment, digitizing temperature sensor 10 is further normalized by selecting a value of Nc such that a change of 1° C. at the temperature sensing current sources results in a change of 8 LSBs (least significant bits) at the digital output ADCOUT. In this manner, the signed binary digital numbers at ADCOUT are easily interpreted as temperature in degrees Celsius with an LSB weight of 0.125° C.

In the above description, the oscillators in the frequency ratio digitizing temperature sensor are implemented using current-to-frequency converters (I/F converters). Instead of using oscillators that are sensitive to an applied current, the oscillators in the frequency ratio digitizing temperature sensor can also be implemented using voltage sensitive oscillators, or voltage-to-frequency converter circuits (V/F converters). Due to the inherent power supply rejection capability of the temperature sensing circuits generating the temperature dependent currents, the use of I/F converters is generally preferred over V/F converters. However, the linearity correction method of the present invention applies equally well to a digitizing temperature sensor implemented using V/F converter topologies with appropriate change in the input signal from a current signal to a voltage signal. A frequency ratio digitizing temperature sensor can be implemented using a V/F converter topology as long as the data frequency Fdata increases with temperature and the reference frequency Fref is relatively constant and also as long as the V/F converters are configured such that their frequency increases with increasing input voltage and decreases with increasing reference voltage.

As described above, digitizing temperature sensor 10 of FIG. 1 uses two current-to-frequency (I/F) converters 40 and 50 to implement the input-signal-to-frequency function. The structure and operation of an I/F converter is as follows. In the most general term, an I/F converter includes a capacitor, a comparator and switching circuits. The I/F converter receives an input current Iin and a reference voltage Vref as input signals. The capacitor is charged by the input current Iin and a linearly increasing ramp voltage is developed at the capacitor. The ramp voltage at the capacitor is compared to a reference voltage Vref. When the ramp voltage exceeds the reference voltage Vref, the comparator output signal is asserted and the switching circuits are reset to discharge the capacitor, thereby resetting the voltage at the capacitor to zero and starting the voltage ramp process over again. The time between each assertion of the comparator output signal defines the period of the output frequency Fout of the I/F converter. For ideal systems exhibiting instantaneous reset, the output frequency Fout can be given as:

$$F_{out} = \frac{I_{in}}{C_{int} V_{ref}},$$ Eq. (2)

where $I_{in}$ is the input current in Amperes, $C_{int}$ is capacitance of the internal integration capacitor in Farads and $V_{ref}$ is the reference voltage used at the comparator.

In actual circuits, there is a finite delay time between the ramp voltage exceeding the reference voltage Vref and the start of another ramping cycle. For low power application, where the amount of power used in the comparator limits the comparison speed, this delay time can become large and a significant contributor to the linearity errors of the output frequency signal. For an I/F converter exhibiting a delay time, $t_d$, between the ramp voltage of the capacitor exceeding the reference voltage and the start of the next ramp cycle, the output frequency is given by:

$$F_{out} = \frac{1}{\left(\frac{C_{int} V_{ref}}{I_{in}} + t_d\right)},$$ Eq. (3)

The presence of delay time $t_d$ affects the offset and gain of the I/F transfer function, but these linear errors are easily corrected in a typical system. Unfortunately, the presence of the delay time also causes the output frequency to increase more slowly at high frequencies, where the delay time is a larger portion of the total period, thus causing a linearity error in the transfer function between Iin and Fout. The magnitude of the linearity error caused by $t_d$ increases with increasing value of the ratio $t_d/t_{ramp}$, where $t_{ramp}$ is time period of the ramp voltage. The $t_d/t_{ramp}$ ratio and the linearity error can be minimized either by increasing the time $t_{ramp}$ (which requires a lower input current Iin or a larger capacitance Cint or a larger reference voltage Vref) or by decreasing the delay time $t_d$.

Figure 2:
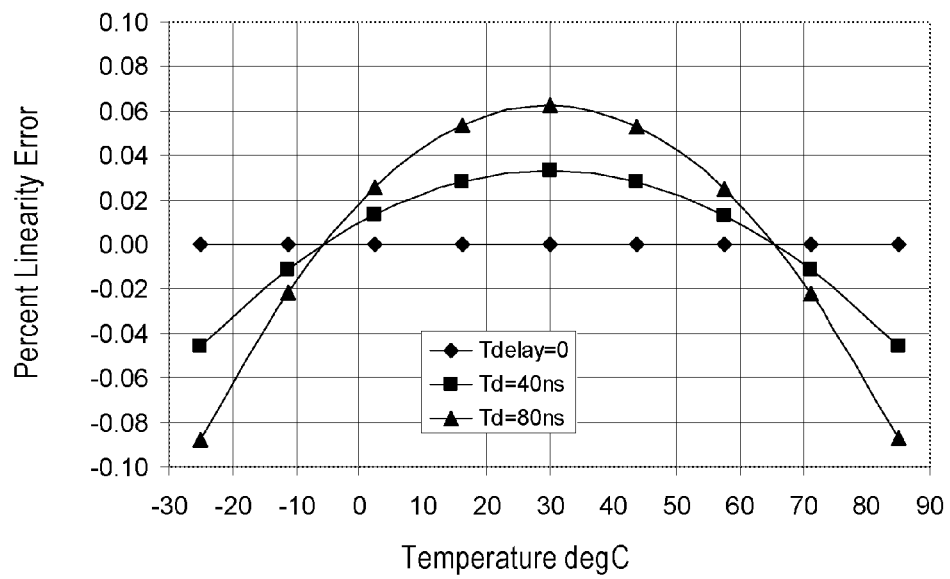
FIG. 2 is a plot illustrating the bow linearity error in the temperature measurements due to propagation delays through the current-to-frequency converters.

FIG. 2 is a plot illustrating the bow linearity error in the temperature measurements due to propagation delays through a current-to-frequency converter. In the present example, the ramp time $t_{ramp}$ is assumed to be 2 μs. FIG. 2 illustrates the linearity errors for cases where there is no delay, $t_d$=0 (an ideal case), and where there is a 40 ns and an 80 ns delay. As can be observed from the plot, when the delay time is 80 ns, a linearity error of 0.15% p-p in the output frequency, which is roughly 1 part in 667, is observed. A system with a linearity requirement of 11 bits needs a peak-to-peak linearity error of less than $1/(2^{11})$=0.049% which is roughly a third of the nonlinearity observed in FIG. 2. Note that the induced linearity error is a convex "bow" shaped curve.

The amount of linearity error in FIG. 2 roughly doubles for a doubling of the delay time $t_d$. In order to construct a system with well controlled linearity, it is thus necessary to design the I/F converters such that the delay time is constant, or very nearly constant, in order to keep the linearity error of the I/F converters relatively fixed and thus correctable by a fixed linearity correction method. Thus, according to one aspect of the present invention, the digitizing temperature sensor is preferably implemented using an I/F converter that minimizes variations in the delay time $t_d$ through the I/F converter, preferably by minimizing the delay time itself.

The "bow" shaped linearity error caused by the delay time $t_d$ of the I/F converters will by itself tend to linearize an I/F circuit exhibiting a concave "bowl" linearity error and will be shown below to contribute to the linearization of the temperature sensor system. In general, the linearity correction method of the present invention does not attempt to get significant linearity correction of the bow linearity error due to delay time $t_d$, although the presence of the bow error does reduce the amount of correction required within the digitizing temperature sensor system. Thus, in designing the digitizing temperature sensor, the parameter $t_d$ is not varied in order to obtain maximal linearity correction. Rather, the linearity correction method of the present invention assumes an attempt to minimize the delay time $t_d$ to the extent that any variation in the delay time $t_d$ over time and temperature and fabrication processing is a negligible portion of the voltage ramp time $t_{ramp}$. Then, the linearity correction method of the present invention can be applied to yield an optimum linearity correction over time, temperature and circuit processing.

Note that the presence of the time delay term also affects the slope and offset of the output frequency of an I/F converter. However, slope and offset errors can be readily corrected in the digital domain by use of the offset and gain adjust parameters.

Figure 3:
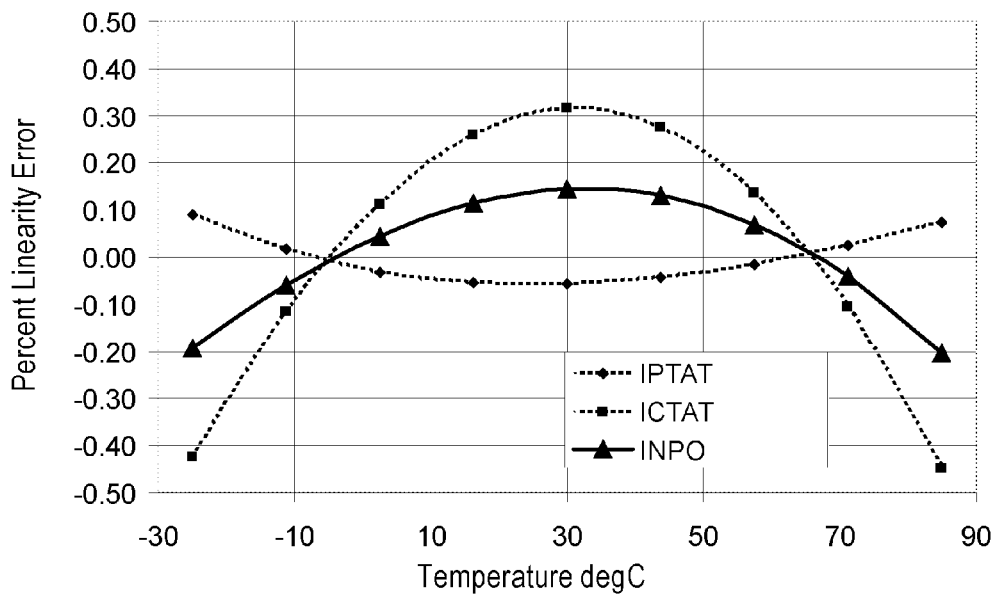
FIG. 3 is a plot illustrating the linearity error of the temperature dependent currents.

FIG. 3 is a plot illustrating the linearity error of the temperature dependent currents generated by the temperature sensing circuit 20 of FIG. 1. As described above, temperature sensing circuit 20 generates a PTAT current IPTAT and a CTAT current ICTAT by use of two bipolar transistors operating at different current densities. Well known diode equations indicate that the base-to-emitter voltage Vbe of a bipolar transistor decreases somewhat linearly with temperature and that the difference between the base-to-emitter voltages ΔVbe of two diodes at different current densities increases in a more linear manner with applied temperature. The PTAT and CTAT currents are combined to generate a first order temperature independent reference current Inpo.

When the PTAT and CTAT currents are combined with the weighting that results in cancellation of the first order slope error, the resulting "zero temperature coefficient" reference current Inpo still exhibits linearity error due to the dominant bow of the CTAT current component, as shown in FIG. 3. The magnitude of this linearity error as shown in FIG. 3 is 0.35% p-p, which is roughly 7 times larger than the desired worst case linearity error for a temperature sensor system of interest. The nonlinear characteristic over temperature of the temperature independent reference current Inpo of the digitizing temperature sensor is the most significant linearity degradation within the frequency ratio digitizing temperature sensor.

Figure 4:
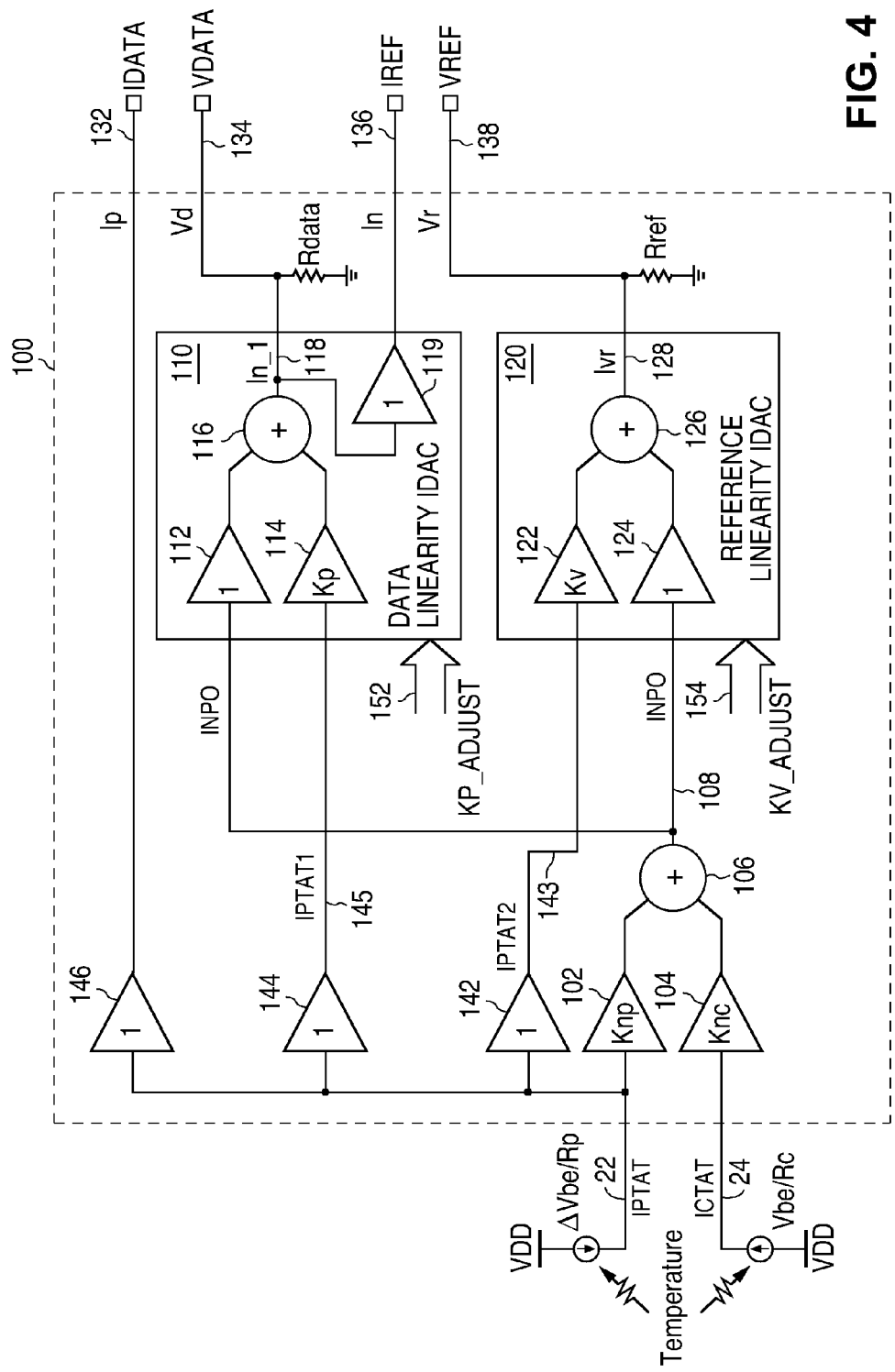
FIG. 4 is a schematic diagram of an input generation circuit implementing 3-port linearity correction in the frequency ratio digitizing temperature sensor of FIG. 1 according to one embodiment of the present invention.

FIG. 4 is a schematic diagram of an input generation circuit implementing 3-port linearity correction method in the frequency ratio digitizing temperature sensor of FIG. 1 according to one embodiment of the present invention. In FIG. 4, input generation circuit 100 includes a pair of linearity IDACs 110, 120 where digital numbers KP_ADJUST and KV_ADJUST are applied to set the magnitude of the PTAT current component. Input generation circuit 100 provides a pair of corrected reference currents to linearize the digital output signal of the frequency ratio digitizing temperature sensor 10 as well as to provide a stabilized reference frequency.

A unique feature of the input generation circuit 100 of the present invention is that the reference voltages and the reference current are not generated from a bandgap voltage. Instead, a reference current is generated and applied across a resistor to form the reference voltage where the resistance of the resistor may exhibit significant change over temperature. A salient feature of the linearization method of the present invention is the use of identical copies of the same reference current at the current input to the reference I/F converter and to make the reference voltage for the data I/F converter.

Referring to FIG. 4, input generation circuit 100 receives a PTAT current IPTAT (node 22) and a CTAT current ICTAT (node 24) from the temperature sensing circuit. Current IPTAT is mirrored by a buffer 146 as a current Ip and is provided on an output node 132 as the temperature dependent input current Idata for the data I/F converter 40 in digitizing temperature sensor 10 (FIG. 1).

Input generation circuit 100 includes a first summing circuit to generate a first order temperature independent current Inpo from a weighted sum of the currents IPTAT and ICTAT. Specifically, current IPTAT is coupled to a buffer 102 where a current multiplication factor Knp is applied to the PTAT current and current ICTAT is coupled to a buffer 104 where a current multiplication factor Knc is applied to the CTAT current. The currents generated by buffers 102 and 104 are summed by a summer 106 to generate the Inpo current on a node 108. The Inpo current, being a combination of a PTAT current component and a CTAT current component, is nominally stable over temperature.

In input generation circuit 100, a data linearity IDAC 110 is used to generate a first corrected reference current by adding a small, digitally programmable fraction of the PTAT current to the Inpo current. Specifically, the current IPTAT, mirrored by a buffer 144 as current IPTAT1, is coupled to a buffer 114 in data linearity IDAC 110. Buffer 114 applies a current multiplication factor Kp as the correction factor to current IPTAT1 to generate a fraction of the PTAT current as the correction current. The fraction of the PTAT current from buffer 114 is added to the current Inpo, mirrored by a buffer 112, by a summer 116 to generate an output current In_1 on a node 118. Current In_1 is primarily the current Inpo but the addition of the small fraction of the PTAT current renders the current In_1 not entirely temperature independent. In fact, current In_1 is made a little more PTAT than temperature stable and this nature of current In_1 is exploited to correct the linearity error caused by the time delay in the I/F converters of the temperature sensor circuit.

The first corrected reference current In_1 is mirrored by a buffer 119 as a current In and is provided on an output node 136 to be used as the reference current Iref of the reference I/F converter 50 in digitizing temperature sensor 10 (FIG. 1). A duplicate copy of the first corrected reference current In_1 is also applied to a resistor Rdata where the voltage drop across the resistor is a reference voltage Vd. Reference voltage Vd is provided on an output node 132 as the reference voltage Vdata of the data I/F converter 40 in digitizing temperature sensor 10 (FIG. 1). In this manner, identical copies of the first corrected reference current In_1 is applied as the reference current for the reference oscillator and as the reference voltage for the data oscillator of the frequency ratio digitizing temperature sensor.

In particular, the input generation circuit 100 of the present invention is different from conventional frequency ratio temperature sensor circuits where the reference voltages Vdata and Vref for the two oscillators are the same voltage generated from a voltage reference circuit. In accordance with the present invention, the reference voltage Vdata for the data oscillator and the reference voltage Vref for the reference oscillator are generated separately and therefore the two voltages are decoupled from each other. The reference voltage Vdata is made to have a temperature dependent variation exhibiting a small increase with temperature while the reference voltage Vref exhibits a different, larger increase with temperature.

In input generation circuit 100, a reference linearity IDAC 120 is used to generate a second corrected reference current by adding a small fraction of the PTAT current to the Inpo current. The fraction of PTAT current used to form the second corrected reference current is different from the fraction used to form the first corrected reference current by use of different correction factors or current multiplication factors. Specifically, the current IPTAT, mirrored by a buffer 142 as current IPTAT2, is coupled to a buffer 122 in reference linearity IDAC 120. Buffer 122 applies a current multiplication factor Kv to current IPTAT2 to generate a fraction of the PTAT current as another correction current. The fraction of the PTAT current from buffer 122 is added to the current Inpo, mirrored by a buffer 124, by a summer 126 to generate an output current Ivr on a node 128. Current Ivr is primarily the current Inpo but the addition of the small fraction of the PTAT current renders the current Ivr slightly PTAT.

The second corrected reference current Ivr is applied to a resistor Rref where the voltage drop across the resistor is a reference voltage Vr. Reference voltage Vr is provided on an output node 138 as the reference voltage Vref of the reference I/F converter 50 in digitizing temperature sensor 10 (FIG. 1). By using the second corrected reference current Ivr to generate the reference voltage Vref for the reference oscillator, a temperature stabilized reference frequency is obtained.

In input generation circuit 100 of FIG. 4, the unity gain buffers, such as buffers 112, 119, 124, 142, 144, and 146, are used for current duplication and can be implemented as unity gain amplifiers or as unity-sized current mirrors. Furthermore, unity gain buffers 112, 119, 124, 142, 144, and 146 are included where current duplication is required to generate a duplicate copy of the input current. The unity gain buffers can be omitted if current duplication is not necessary for the operation of the circuit. The use of unity-gain buffers or unity-sized current mirrors to make duplicate copies of an input current when necessary is well known in the art. Furthermore, in the actual implementation of the input generation circuit of the present invention, it is understood that a current used for the output current or applied to a resistor can be the originally generated current or a duplicate copy of the originally generated current. That is, the use of an originally generated current or a duplicate copy of the current at a given node is interchangeable and is not critical to the practice of the present invention.

The current multiplication factors Knp and Knc for forming the temperature independent current Inpo can be derived in a conventional manner. The current multiplication factors (the correction factors) Kv and Kp can be derived mathematically as described below or empirically through simulation or device characterization. When the multiplication factors Kv and Kp are derived mathematically or through simulation, fine tuning of the values may be necessary for actual implementation.

When the input generation circuit 100 of FIG. 4 is incorporated in the temperature sensor of FIG. 1, a linearity and reference clock stability corrected temperature sensor is realized. The temperature sensor also operations to correct linearity errors due to the time delay in the oscillators. The operational characteristics of digitizing temperature sensor 10 implemented using input generation circuit 100 of FIG. 4 will now be described. The digital output signal ADCOUT of the temperature sensor, for the case where the time delay within the comparators is not negligible, can be written as:

$$ADC_{out} = N_c \left[ \frac{\left( \frac{C_{ref} I_{vr} R_{ref}}{I_n} + t_{d\_ref} \right)}{\left( \frac{C_{data} I_{n\_1} R_{data}}{I_p} + t_{d\_data} \right)} - 1 \right]. \quad \text{Eq. (4)}$$

The expression in Equation (4) can be simplified if the following assumptions are made: Cdata=Cref=C, Rdata=Rref=R, In=In_1 and td_data=td_ref=td. Note that current Ip is the same as the PTAT current Idata. The simplified form for the digital output signal ADCOUT is:

$$ADC_{out}(T) = N_c \left[ \frac{\left( \frac{I_{vr}}{I_n} - \frac{I_n}{I_p} \right)}{\left( \frac{I_n}{I_p} + \frac{t_d}{RC} \right)} \right]. \quad \text{Eq. (5)}$$

When the delay time td is assumed to be zero, Equation (5) further simplifies to:

$$ADC_{out}(T) = N_c \left[ \frac{I_p I_{vr}}{I_n^2} - 1 \right]. \quad \text{Eq. (6)}$$

When no linearity correction is applied to the temperature sensor, (that is, Kv=Kp=0), the temperature independent current Inpo as shown in FIG. 3 is used to generate the reference voltages Vdata and Vref for both the reference and data oscillators and also used as the reference current Iref of the reference oscillator. That is, In=Ivr=Inpo. As can be observed from Equation (6) above, the linearity of current Inpo affects the denominator of the ADC transfer function. If the PTAT current Ip is applied at current input of the data I/F converter, its linearity affects the numerator of Equation (6). Thus, the resulting ADC linearity error is a magnified "bowl" error caused by the bowl error of the PTAT current summed with an additional "bowl" error caused by the reciprocal of the CTAT "bow" error in current Inpo.

Figure 5:
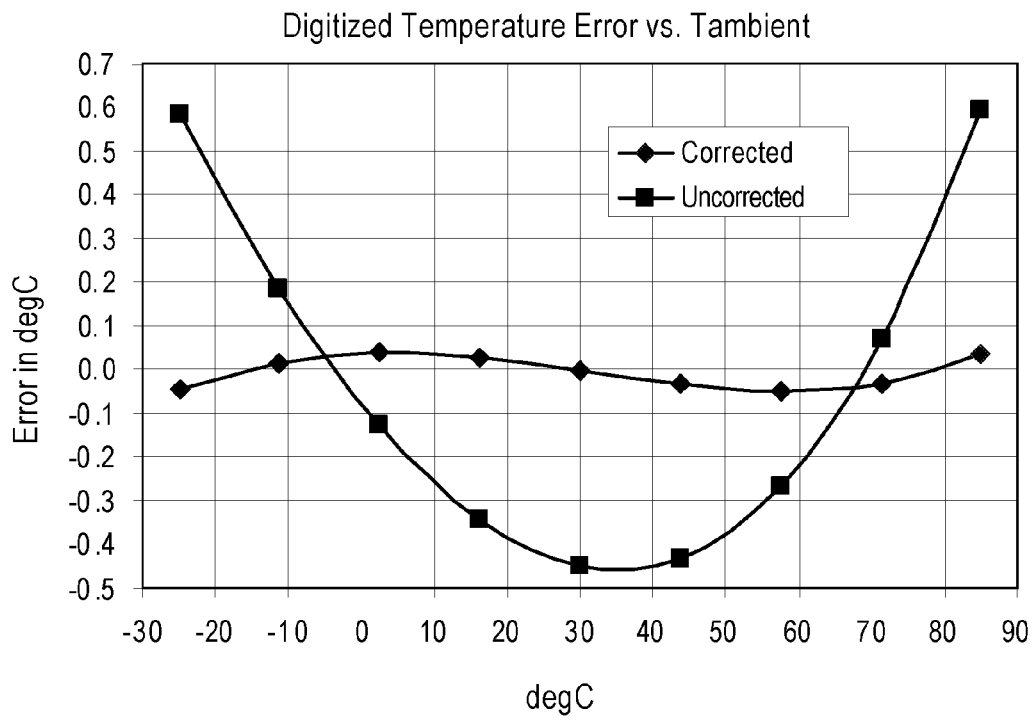
FIG. 5 is a plot illustrating the temperature errors of temperature output signals from a linearized temperature sensor as compared to an uncorrected temperature sensor.

FIG. 5 is a plot illustrating the temperature errors of temperature output signals from a linearized temperature sensor as compared to an uncorrected temperature sensor. Referring to FIG. 5, when the current Inpo is used directly as the input current to the reference I/F converter and also used directly to generate the voltage references Vdata and Vref for both I/F converters, the resulting temperature measurement will have linearity errors as shown by the "uncorrected" curve in FIG. 5. The peak-to-peak error is 0.955% which is equivalent to 1.05° C. p-p for a temperature excursion of −25 to 85° C. and is nearly 20 times larger than the worst case permissible linearity error in typical systems.

However, when linearity correction is applied to the temperature sensor, (that is, Kv and Kp≠0), the linearity error of the digitizing temperature sensor are almost completely eliminated, as shown by the "corrected" curve in FIG. 5. The linearity error observed in the corrected curve in FIG. 5 is negligible, thereby ensuring high precision in the temperature sensor measurements.

Input generator circuit 100 of FIG. 4 implements the 3-port linearity correction method where the reference frequency is stabilized together with the linearization of the digital temperature output. The reference frequency correction is provided because of non-ideal characteristics of the resistors and capacitors used to form the I/F converter. The correction of the reference frequency together with the linearity correction of the digital temperature measurements using the 3-port linearity correction method of the present invention operate as follows.

Semiconductor integrated circuits made from typical, inexpensive CMOS processes usually do not have available resistors of good stability over temperature. Even resistors fabricated from thin films of metal, such as Nichrome or Sichrome, will typically exhibit a mostly linear change in resistance versus temperature on the order of 100 ppm per degree Celsius. Over a span of 100° C., the value of such a resistor may change by 1%. When such a resistor is used to form the reference resistor Rref in the I/F converter, even this small linear change in resistance value of the resistor Rref will tend to make the reference frequency vary with both linear and nonlinear components. This is due to the presence of the resistance in the denominator of the reference frequency transfer function. First, the resistance of the reference resistor Rref can be expressed as a fixed resistance component and a temperature varying component given as:

$$R_{ref}(T)=R_0+\Delta R(T).$$

Then, the output frequency Fref of the reference I/F converter incorporating such a reference resistor is given as:

$$F_{ref} = \frac{I_n}{C_{ref} I_{vr} (R_0 + \Delta R(T))}. \quad \text{Eq. (7)}$$

Changes in the value of the capacitance of capacitor Cref in the I/F converter will have a similar effect on the reference frequency. Note that changes that identically affect resistors Rref and Rdata or changes that identically affect capacitors Cref and Cdata will not significantly affect the linearity of the digitized temperature measurements (see Equation (6) above), but any changes in the resistance of resistor Rref or the capacitance of capacitor Cref will cause the reference clock frequency to vary. To obtain an optimal stable reference clock frequency while minimizing temperature linearity errors when either resistor Rref or capacitor Cref exhibits even fairly small deviations over the temperature span of interest, one of the input signals to the reference I/F converter is adjusted as part of the linearity correction method of the present invention.

More specifically, the 3-port linearity correction method illustrated in FIG. 4 includes generation of the second corrected reference current for use to generate the reference voltage Vref. In this manner, the stability of the reference frequency is improved at the same time that linearity correction is applied to the digital temperature measurement through the first corrected reference current.

The correction provided by the input generation circuit 100 of FIG. 4 involves forming two corrected reference currents In (or In_1) and Ivr where a small fraction of the PTAT current is added to the current Inpo to form current In and a different small fraction of the PTAT current is added to the current Inpo to form current Ivr. The two corrected reference currents can be expressed as:

$$I_n = I_{npo} + k_p I_p; \text{ and}$$

$$I_{vr} = I_{npo} + k_v I_p.$$

When the above expressions are substituted in Equation (5) above and again assuming that the delay time td is zero, the simplified form for the digital output signal ADCOUT is given as:

$$ADC_{out}(T) = N_c \left[ \frac{I_p (I_{npo} + k_v I_p)}{I_{npo}^2 + 2k_p I_p I_{npo} + k_p^2 I_p^2} - 1 \right]. \quad \text{Eq. (8)}$$

The two small constants Kp and Kv must be chosen to both reduce the linearity error of the temperature sensor system and to minimize disturbance to the reference clock frequency. The implementation of the 3-port linearity correction method of the present invention requires determining the proper set of parameters Kp, Kv and Nc for the temperature sensor to minimize linearity and accuracy errors in the overall system. The determination of the parameters Kp, Kv and Nc mathematically and the application of the mathematical solution in a system will now be described.

Figure 6:
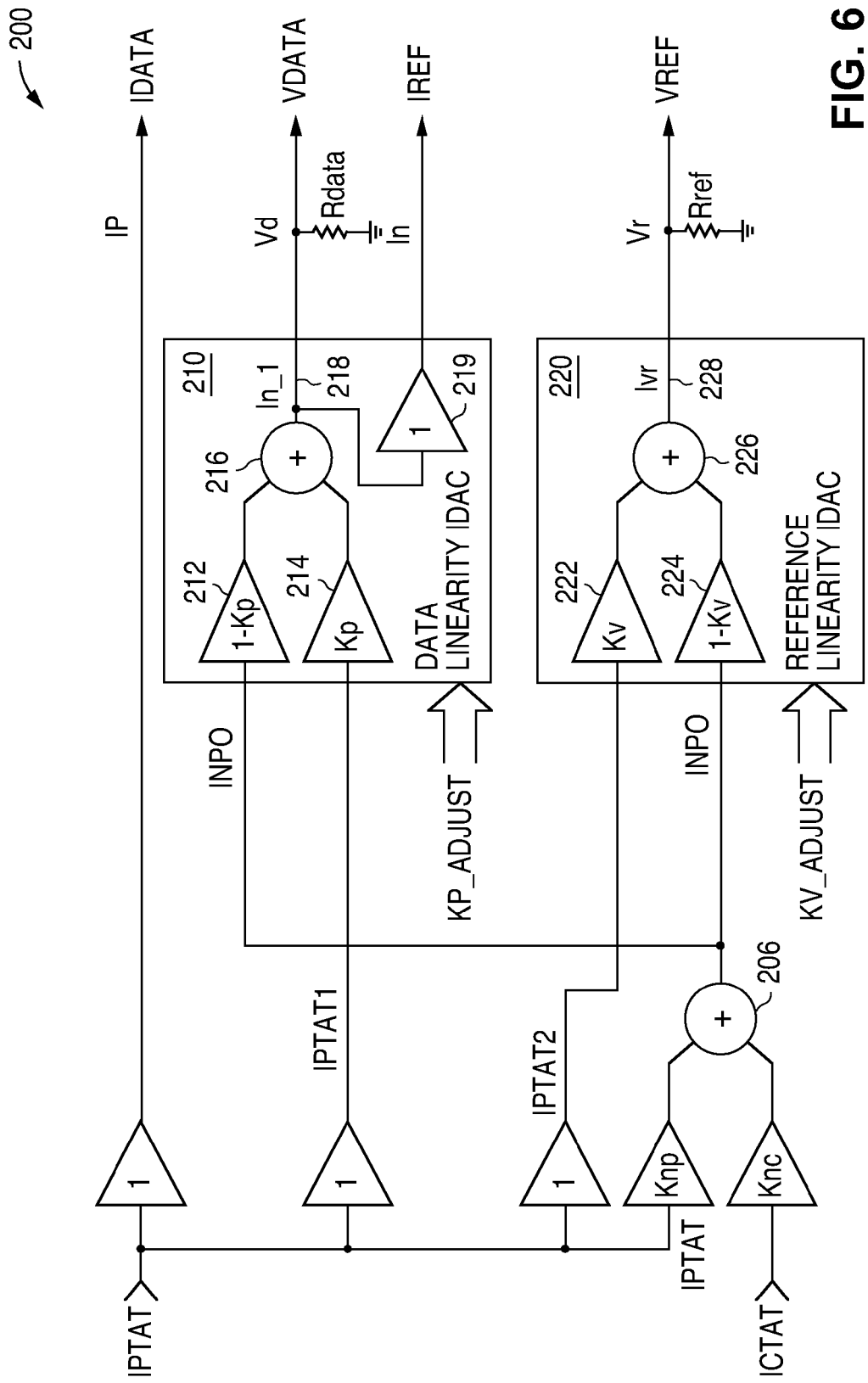
FIG. 6 is a schematic diagram of an input generation circuit for the frequency ratio digitizing temperature sensor of FIG. 1 according to a second embodiment of the present invention.

The derivation of the parameters Kp, Kv and Nc is better described by use of an input generation circuit with normalized current values. FIG. 6 is a schematic diagram of an input generation circuit for the frequency ratio digitizing temperature sensor of FIG. 1 according to a second embodiment of the present invention. Referring to FIG. 6, input generation circuit 200 is constructed in the same manner as input generation circuit 100 of FIG. 4 except for the current multiplication factors applied in the linearity IDAC circuits. In FIG. 6, the first and second corrected currents are normalized to maintain a constant total current magnitude for each current throughout the temperature sensor. That is, in input generation circuit 100, when the fraction Kp*IPTAT current is added to the current Inpo, the resulting corrected reference current In_1 will necessarily have an increased current magnitude. The same applies to the corrected reference current Ivr. In some applications, the increased current magnitude is not desirable. In that case, the input generation circuit 200 of FIG. 6 can be used so that the reference currents maintain a constant magnitude throughout the temperature sensor system.

Input generation circuit 200 includes a data linearity IDAC 210 for providing a normalized first corrected reference current In_1 and a reference linearity IDAC 220 for providing a normalized second corrected reference current Ivr. In data linearity IDAC 210, a buffer 214 applies a current multiplication factor Kp to the PTAT current IPTAT1 to generate a first fraction of the PTAT current. A buffer 212 applies a current multiplication factor of 1-Kp to the temperature independent current Inpo to provide an INPO current that is reduced in magnitude by a Kp amount. The current outputs from buffers 212 and 214 are added by summer 216 to generate the first corrected reference current In_1 on a node 218 where the current In_1 has a final current magnitude that is the same as the current Inpo.

The current In_1 is then used as the input current Iref of the reference oscillator and used to generate the reference voltage Vdata for the data oscillator, in the same manner as described above.

In reference linearity IDAC 220, a buffer 222 applies a current multiplication factor Kv to the PTAT current IPTAT2 to generate a second fraction of the PTAT current. A buffer 224 applies a current multiplication factor of 1-Kv to the temperature independent current Inpo (from summer 206) to provide an INPO current that is reduced in magnitude by a Kv amount. The current outputs from buffers 222 and 224 are added by summer 226 to generate the second corrected reference current Ivr on a node 228 where the current Ivr has a final current magnitude that is the same as the current Inpo. The current Ivr is then used to generate the reference voltage Vref for the reference oscillator, in the same manner as described above.

Now, the determination of the parameters Kp, Kv and Nc is described. The 3-port linearity correction method for a frequency ratio digitizing temperature sensor of the present invention provides a more stable reference clock frequency, while still minimizing temperature digitization linearity errors, by providing a corrected current to resistor Rref to generate voltage Vref with a temperature coefficient that differs from the temperature coefficient of the corrected current used as the current Iref and used to generate reference voltage Vdata. In order to minimize the variation in the reference frequency, it is desirable that the corrected current for the reference oscillator cancels as much of the variations due to capacitance and resistance drift as is possible.

First, normalized functions containing the first and second order temperature effects on the resistance Rref and the capacitance Cref of the reference oscillator are given as follows:

$$R_n(T) = \frac{R_{ref}(T)}{R_{ref}(0)};$$ Eq. (9)

and $$C_n(T) = \frac{C_{ref}(T)}{C_{ref}(0)}.$$ Eq. (10)

The two normalized functions of Equations (9) and (10) are multiplied together to form Rn(T)Cn(T). Next, when the ratio of the first corrected current In to the second corrected current Ivr is set equal to the normalized RnCn function, the most stable reference frequency will result. Thus, the first design constraint of the 3-port linearity correction method is given as:

$$\frac{I_n(T)}{I_{vr}(T)} = R_n(T)C_n(T).$$ Eq. (11)

The ratiometric constraint defined in Equation (11) can be codified in an alternate form as follows:

$$\frac{I_{vr}(T)}{I_n(T)} = \frac{1}{R_n(T)C_n(T)}.$$ Eq. (12)

Now, Equation 5 above, describing the transfer function of the digital output signal ADCOUT of the digitizing temperature sensor is used to derive the second constraint. For the digitizing temperature sensor, it is desirable that the digital output signal ADCOUT, over some desired temperature range T, to be a linear function defined as some gain constant times T. For the purpose of the present discussion, a gain constant "a" having a value of one divided by Nc is assumed. When offset errors are neglected as they do not affect linearity, the desired linearity equation can be stated for a range of temperatures T as:

$$aT = \left[\frac{\left(\frac{I_{vr}}{I_n} - \frac{I_n}{I_p}\right)}{\left(\frac{I_n}{I_p} + \frac{t_d}{RC}\right)}\right].$$ Eq. (13)

Equation (13) can be rewritten and simplified to form the general second constraint for linearizing a frequency ratio digitizing temperature sensor over a temperature range of T using the 3-port linearity correction method. The second design constraint is expressed as follows:

$$\frac{I_p}{I_n} = \left[\frac{(1 + aT)}{\left(\frac{I_{vr}}{I_n} - \frac{(aT)t_d}{RC}\right)}\right].$$ Eq. (14)

Thus, by appropriate choice of the ratio of the PTAT current Ip to the reference current In, used as both the reference voltage Vdata and as the reference current Iref, the linearity of the digitizing temperature sensor can be optimized. The general case optimum choice of ratio is now dependent in part upon the ratio of the delay time to the equivalent RC product at the data I/F converter. The optimum choice of current ratio will also be distinct for each chosen value of the gain parameter a. The ratio Ivr/In is previously determined by the equation for the first constraint.

The two constraints described above will now be used to determine the best choice of correction parameters Kv and Kp as well as the gain adjust parameters Nc and Offset for an exemplary temperature sensor system. In order to simply the mathematical calculation, the normalized input generation circuit of FIG. 6 will be used. The first constraint requires the current ratio Ivr/In defined by equation (12) above and repeated below:

$$\frac{I_{vr}(T)}{I_n(T)} = \frac{1}{R_n(T)C_n(T)}.$$ Eq. (15)

An equation in normalized polynomial form can be obtained by fitting a curve to the measured or simulated values of normalized R and C over the temperature range of interest. In order to use the equation defining the second constraint above for linearizing the system, the first unknown which needs to be found is the current In, which is given by:

$$I_n = \left[\frac{I_p\left(\frac{I_{vr}}{I_n} - \frac{aTt_d}{RC}\right)}{(1 + aT)}\right].$$ Eq. (16)

While Equation (16) is a recursive function of In, the ratio Ivr/In can be determined in approximate polynomial form from Equation (15) of the first constraint. By substituting Equation (5) in Equation (16), the variable In is removed from the right side of Equation (16). This substitution allows Equation (16) to be directly solved for In. In Equation (16), T is the temperature variable in degrees Centigrade. Note that all four current terms in Equation (16) above are functions of temperature T. Current Ip is the PTAT current whose polynomial equation over temperature T can be described by fitting a curve to measurements of current Ip taken at different temperatures. Resistance R is the resistance of the resistor Rref used at the reference voltage input to the reference I/F converter and is a function of temperature T. Capacitance C is the capacitance of the integration capacitor Cref in the reference I/F and is a function of temperature T. Td is the constant delay time within the data or reference I/F converter. Finally, the gain parameter "a" is chosen to re-normalize the output range after the linearizing operation.

In the present example, the renormalizing gain adjustment is implemented digitally by adjusting the number of reference periods per conversion, Nc. In one embodiment, it is convenient to normalize the output data such that 8 LSBs form one degree Centigrade. Thus the gain parameter "a" is defined by:

$$a = \frac{8}{N_c}.$$ Eq. (17)

Equations (16) and (17) can be combined to give:

$$I_n(T) = \left[\frac{\left(\frac{I_p(T)}{R(T)C(T)}\right)\left(1 - \frac{8t_dT}{N_c}\right)}{\left(1 + 8\frac{T}{N_c}\right)}\right]. \quad \text{Eq. (18)}$$

If the parameters Ip, R(T) and C(T) in Equation (18) above are all replaced by polynomials fitted to their curves, an approximate polynomial expression can be obtained for In which is a function of the variable T over the temperature range of interest and also a function of the gain count parameter Nc.

In the implementation of the linearity correction of the present invention, the goal is to find a certain amount of extra PTAT current which must be added to the temperature independent Inpo current to form the current In so that the temperature output signal is linearized. In order to simplify the mathematics, it is assumed that the values Inpo, Ip, R(T), C(T) are all normalized functions which are unity at T=0° C. In order to form a normalized correction current, In, it is necessary to reduce the constant Inpo component when increasing the PTAT component by an amount Kp, as shown in FIG. 6 and equation 19 below:

$$I_n = (1-k_p)I_{npo} + k_pI_p. \quad \text{Eq. (19)}$$

Solving for Kp in Equation (19) above gives:

$$k_p = \frac{I_n - I_{npo}}{I_n - I_p}. \quad \text{Eq. (20)}$$

Similarly, solving for the normalized correction current Ivr yields:

$$I_{vr}(T) = \frac{I_n(T)}{R_n(T)C_n(T)}. \quad \text{Eq. (21)}$$

Correction current Ivr can be found in approximate polynomial form from the polynomial forms of In, R(T) and C(t). Again, the correction can be implemented by adding a small fraction of the PTAT current Ip to the Inpo current in order to obtain the desired normalized correction current Ivr:

$$I_{vr} = (1-k_v)I_{npo} + k_vI_p; \quad \text{Eq. (22)}$$

and $$k_v = \frac{I_{vr} - I_{npo}}{I_{vr} - I_p}. \quad \text{Eq. (23)}$$

The approximate polynomial equations for currents Inpo and Ip are determined by measuring the currents over temperature, and the polynomials describing currents In and Ivr can then be mathematically determined from the polynomial equations for currents Inpo and Ip. If these polynomials are substituted into the equations above and evaluated at a known temperature T and gain count Nc, then a simultaneous estimate of Kp and Kv can be obtained at each pair of values of temperature and gain count Nc. From the Kp and Kv values, the approximate currents Ivr' and In' can be determined and the resulting linearity error and reference clock drift of the temperature sensor can be either computed or physically measured over temperature.

One convenient method to determine the best set of values for Kp, Kv, Nc and Offset Adjust is to simultaneously compute estimates of Kp and Kv at each target value of Nc using the equations above, then examining the resulting linearity and offset exhibited by the temperature sensor over the temperature range of interest when these estimated values are used. The linearity error and required offset correction is typically obtained by use of direct computer evaluation of the polynomials describing the currents substituted into the appropriate I/F converter and ADCOUT transfer function equations above.

Figure 7:
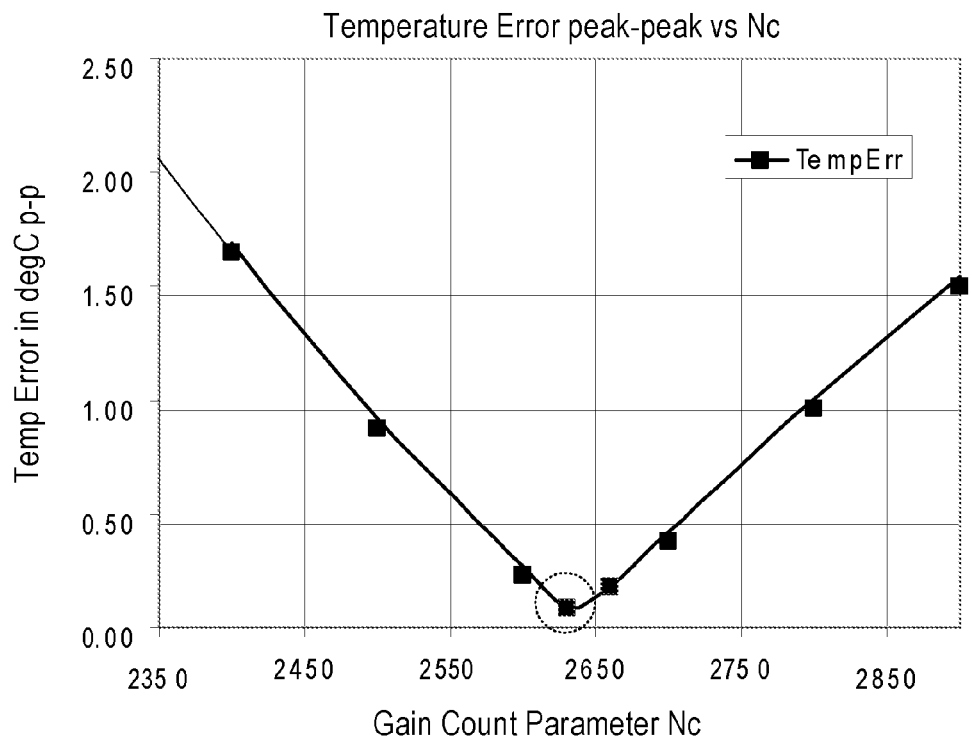
FIG. 7 is a plot illustrating the worst case peak-to-peak temperature error in degrees Celsius simulated over −25 to 85° C. plotted as a function of gain count Nc, where the values of correction factors Kv and Kp have been simultaneously computed at each value of Nc based on the results shown in FIG. 9, for the frequency ratio digitizing temperature sensor of FIGS. 1 and 6.
Figure 8:
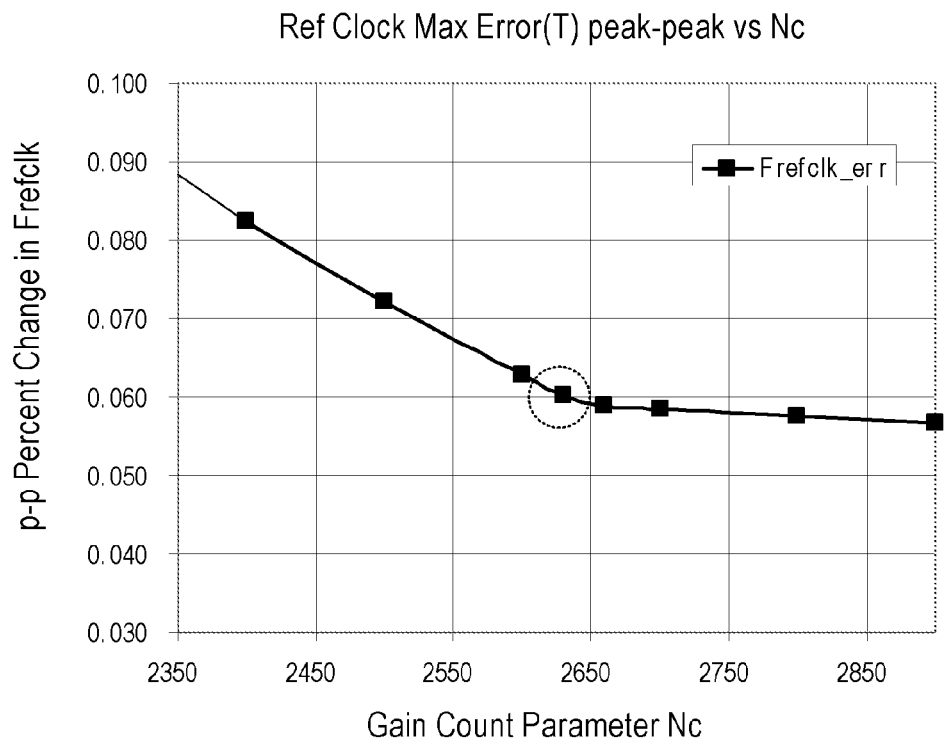
FIG. 8 is a plot illustrating the worst case peak-to-peak change in reference frequency as a function of gain count Nc, where correction factors Kv and Kp have been simultaneously computed at each value of Nc based on the results shown in FIG. 9, for the frequency ratio digitizing temperature sensor of FIGS. 1 and 6.
Figure 9:
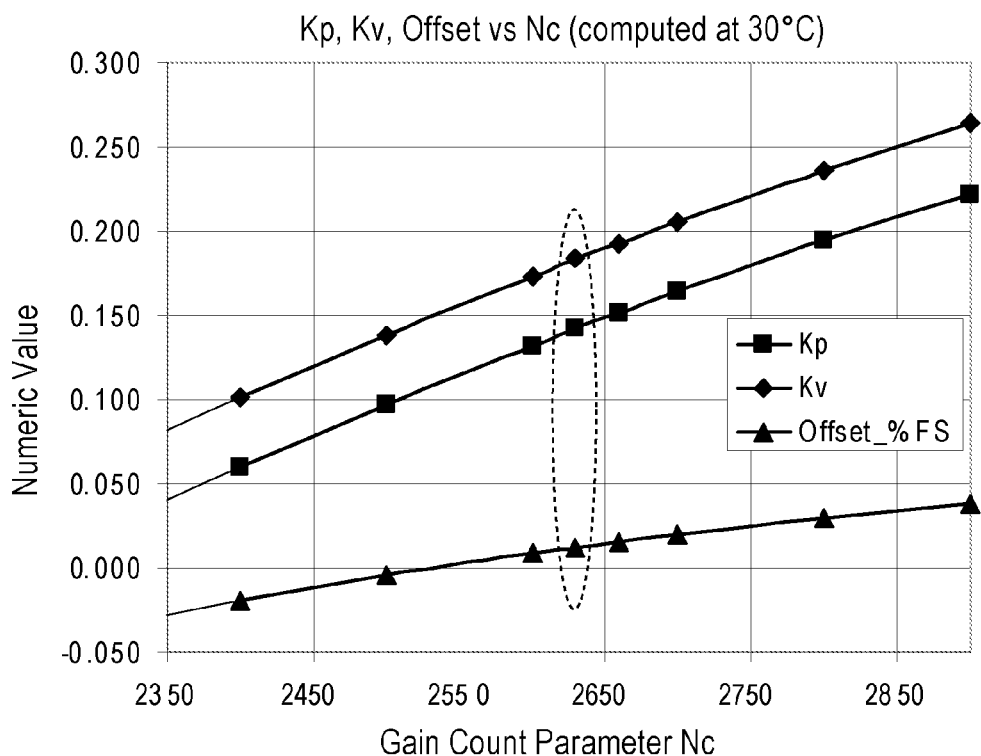
FIG. 9 is a plot illustrating the numeric values of the correction factors Kp, Kv and offset adjust at each target value of Nc at a single temperature for an exemplary system described by polynomial approximations and solved by use of the constraints of Equations 11 and 14 for the frequency ratio digitizing temperature sensor of FIGS. 1 and 6.
Figure 10:
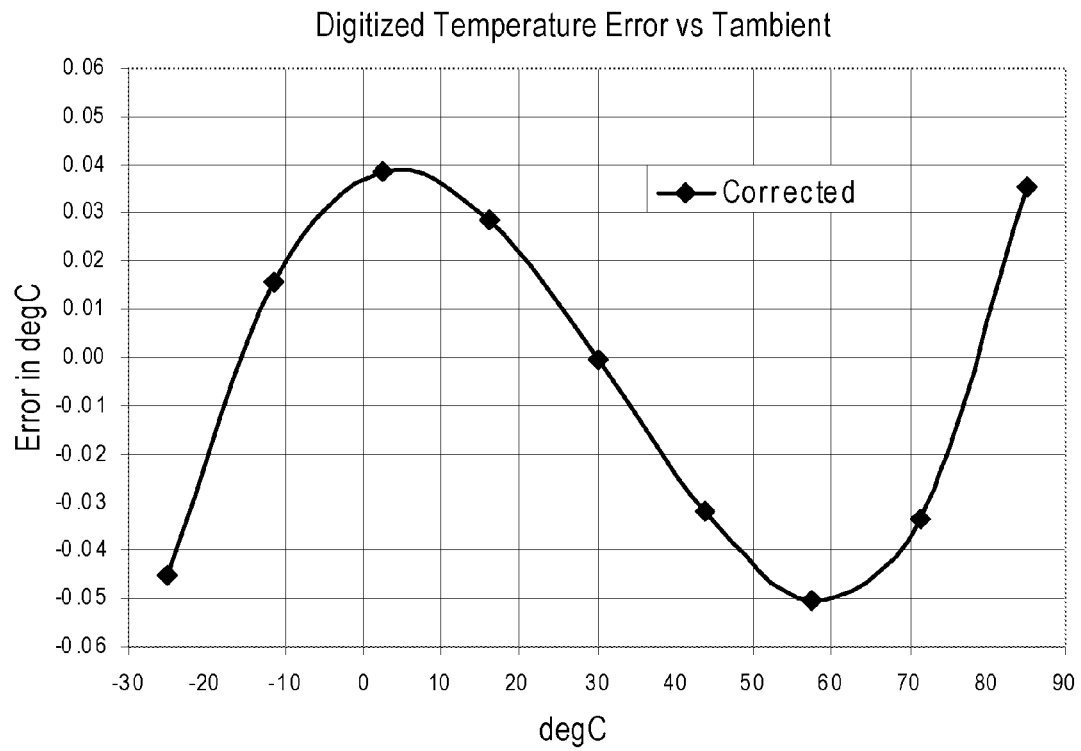
FIG. 10 is a plot illustrating the digitized temperature error versus temperature for the frequency ratio digitizing temperature sensor of FIGS. 1 and 6 implemented using the correction factors selected using FIGS. 7-9.

FIGS. 7-10 illustrate evaluation of various system characteristics at each value of gain count Nc for the digitizing temperature sensor of FIG. 1 incorporating the input generation circuit of FIG. 6. FIG. 7 is a plot illustrating the peak-to-peak linearity temperature error in degrees C. as a function of gain count Nc for the frequency ratio digitizing temperature sensor of FIGS. 1 and 6. FIG. 8 is a plot illustrating the change in reference frequency as a function of gain count Nc for the frequency ratio digitizing temperature sensor of FIGS. 1 and 6. FIG. 9 is a plot illustrating the numeric values of the correction factors Kp, Kv and offset adjust as a function of gain count Nc for the frequency ratio digitizing temperature sensor of FIGS. 1 and 6. FIG. 10 is a plot illustrating the digitized temperature error versus temperature for the frequency ratio digitizing temperature sensor of FIGS. 1 and 6 implemented using the correction factors selected using FIGS. 7-9.

As can be observed from FIG. 7, there is a minimum in the linearity error of the system at one optimum value of Nc, which yields simultaneous optimum estimates of Kp and Kv and offset adjust. The peak to peak stability of the reference clock frequency does not vary significantly as Nc changes with simultaneous changes in Kv, Kp as shown in FIG. 8. The computed target values of Kp, Kv and offset adjust, where the offset adjust is shown as a percent of the full-scale range, as a function of Nc are shown in FIG. 9. By choosing the Kv, Kp, Nc and offset adjust values at that value of Nc which resulted in minimum temperature error (that is, the values within the dotted box), a temperature sensor with less than +/−0.05° C. temperature error over a range from −25 to 85° C. can be obtained as shown in FIG. 10.

Figure 11:
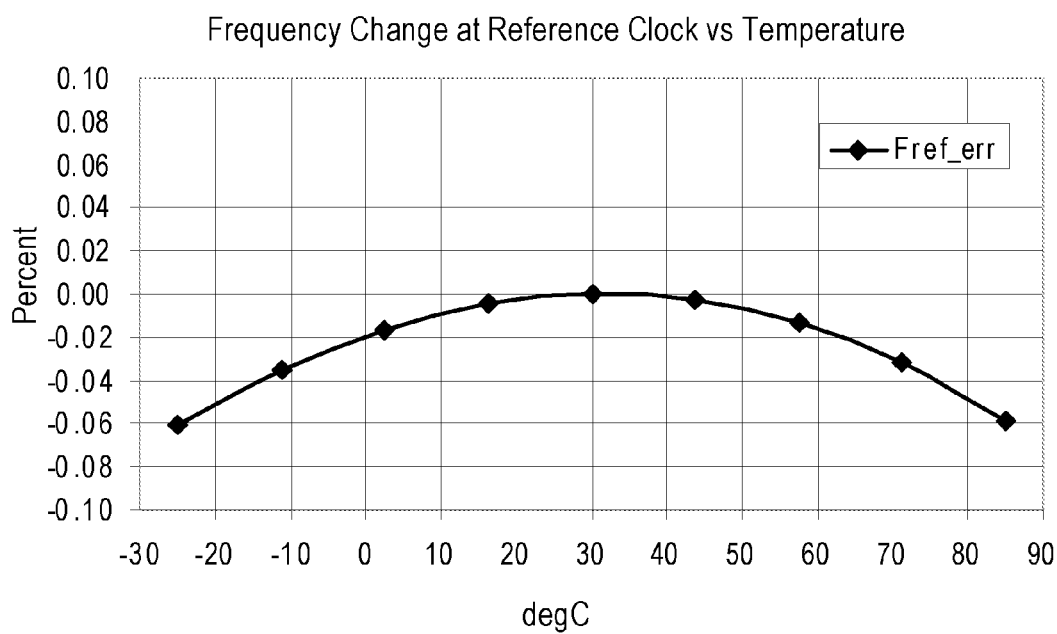
FIG. 11 is a plot illustrating the percent change in reference frequency over temperature for the frequency ratio digitizing temperature sensor of the present invention implemented using the correction factors selected using FIGS. 7-9.

FIG. 11 is a plot illustrating the percent change in reference frequency over temperature for the frequency ratio digitizing temperature sensor of FIGS. 1 and 6 implemented using the correction factors selected using FIGS. 7-9. As can be observed in FIG. 11, the peak-to-peak frequency error of the reference frequency over a range from −25 to 85° C. is only 0.06%.

In the above description, the frequency ratio digitizing temperature sensor is described as implementing the 3-port linearity correction method. In some applications, stability of the reference frequency is not critical. When the application utilizing the digitizing temperature sensor of the present invention can tolerate moderate variations in the reference frequency, such as around 1.25% peak-to-peak variations, the 2-port linearity correction method can be applied. In the 2-port linearity correction method, only one corrected reference current is generated and the reference frequency is left uncorrected. The 2-port linearity correction method is thus more simplified for implementation as compared to the 3-port linearity correction method and may be advantageously applied in some applications.

Figure 12:
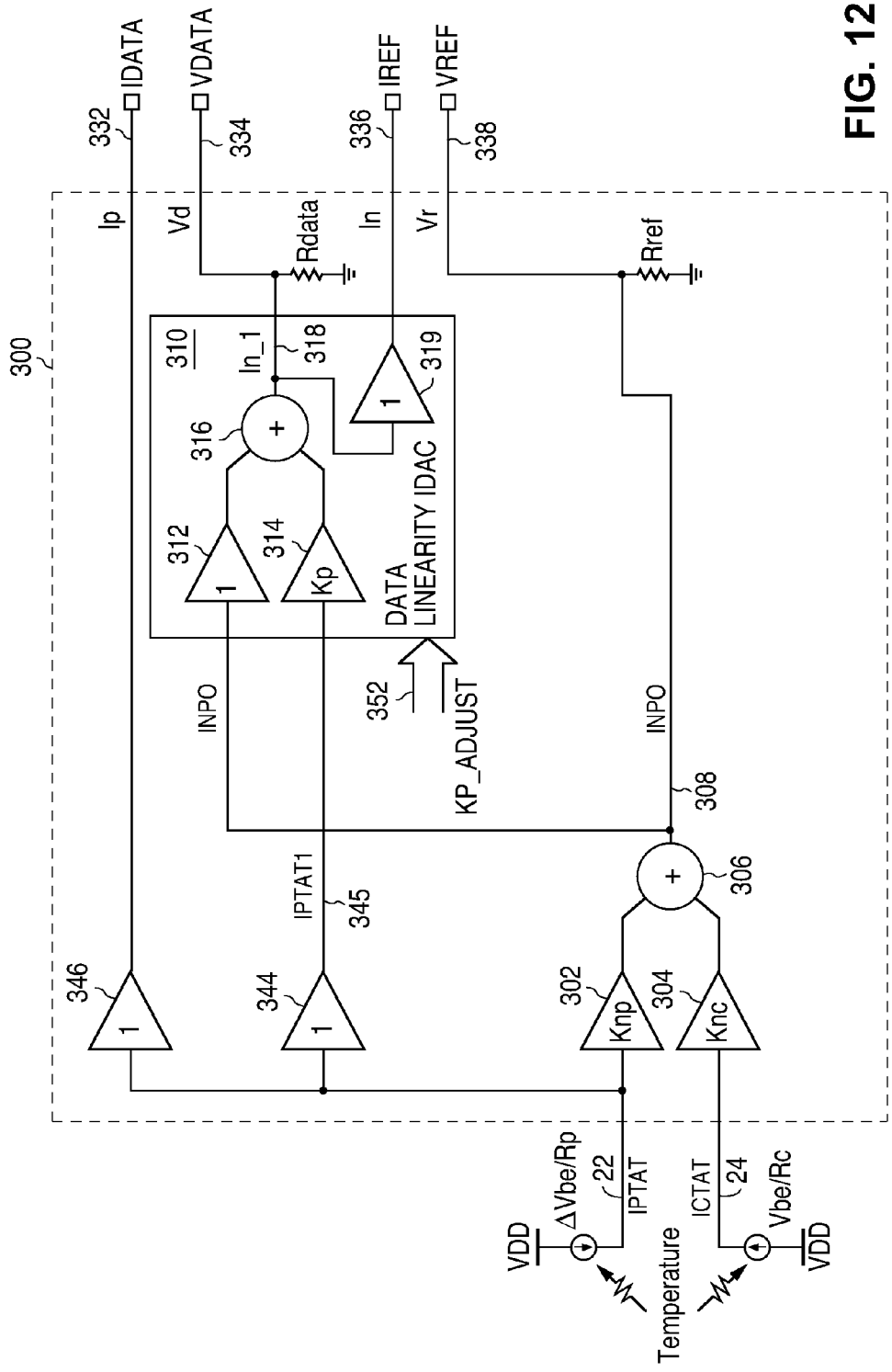
FIG. 12 is a schematic diagram of an input generation circuit implementing 2-port linearity correction for the frequency ratio digitizing temperature sensor of FIG. 1 according to a third embodiment of the present invention.

FIG. 12 is a schematic diagram of an input generation circuit implementing 2-port linearity correction for the frequency ratio digitizing temperature sensor of FIG. 1 according to a third embodiment of the present invention. Referring to FIG. 12, input generation circuit 300 is constructed in the same manner as input generation circuit 100 of FIG. 4 except for the omission of the reference linearity IDAC. Thus, in the 2-port linearity correction method, the corrected reference current In_1 (node 318) generated by summing the current Inpo (node 308) and a Kp fraction of the PTAT current IPTAT1 345 is used simultaneously to modify the reference current Iref of the reference oscillator and the reference voltage Vdata of the data oscillator. Specifically, the corrected reference current In_1 is mirrored by a buffer 319 to form current In which is used as the input reference current Iref (node 336) for the reference oscillator. The corrected reference current In_1 is applied to a resistor Rdata to generate the reference voltage Vdata (node 334) for the data oscillator.

However, the reference voltage Vref (node 338) for the reference oscillator is generated by directly applying the temperature independent current Inpo to a reference resistor Rref. Thus, in the 2-port linearity correction method, only the correction factor Kp is required and the correction factor Kv is not needed.

In input generation circuit 300 of FIG. 12, the corrected reference current In is now given as:

$$I_n = I_{npo} + k_p I_p.$$

The transfer function for the digital output signal ADCOUT, assuming that the time delay $t_d$ through the I/F converters is negligible, is given as:

$$ADC_{out} = N_c \left[ \left( \frac{I_p I_{npo}}{I_{npo}^2 + 2k_p I_p I_{npo} + k_p^2 I_p^2} \right) - 1 \right]. \quad \text{Eq. (23)}$$

The linearity of the transfer function in Equation (23) can now be tuned by adjustment of the value of the single constant Kp. Increasing Kp results in a transfer function whose linearity is increasingly bowed, which cancels the inherent "bowl" shaped error of the uncorrected system. The amount of bow correction obtained using the 2-port linearity correction method is significantly more than using the 3-port linearity correction method. In one embodiment, the correction factors applied using the 3-port linearity correction method are Kp=0.14193, Kv=0.1833, Nc=2630 and Offset~0 LSBs. To achieve the same linearity correction result when using the 2-port linearity correction method, the correction factors applied are Kp=0.0475, Kv=0, Nc=2613 and Offset~0 LSBs. Note that for the same linearity correction result, a smaller value of Kp is required in the 2-port linearity correction method than the 3-port method meaning that less amount of PTAT current is required to be added to the Inpo current to linearize the digital temperature measurements. In fact, based on simulation results, the 2-port linearity correction method actually yields slightly better results, with 0.0847° C. p-p error vs. the 0.089° C. p-p for the 3-port linearity correction case.

Figure 13:
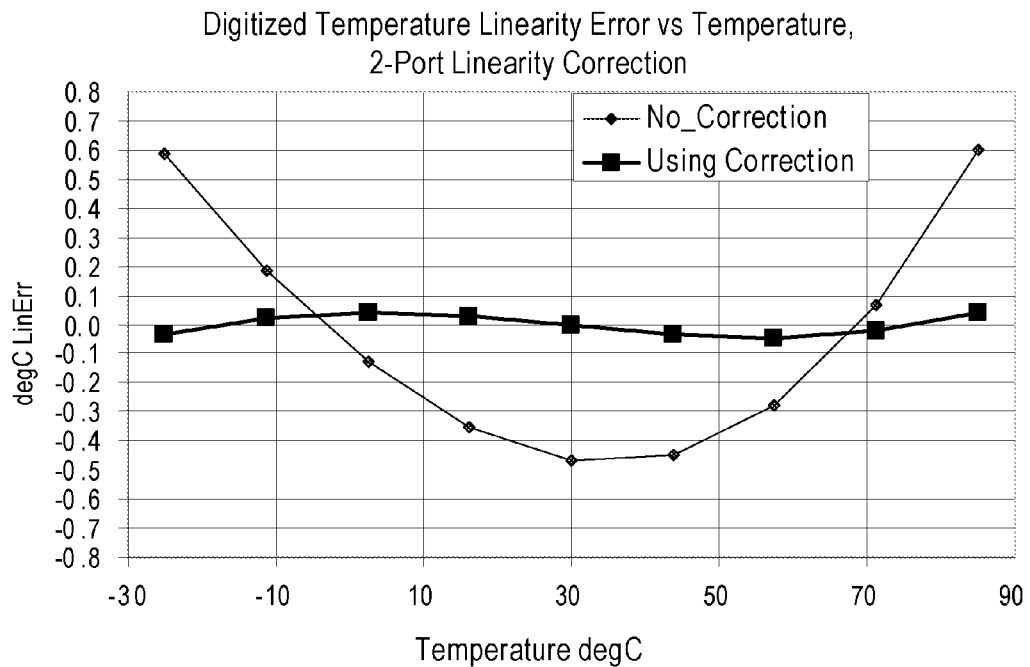
FIG. 13 is a plot illustrating the temperature errors of temperature output signals from the linearized temperature sensor of FIG. 12 as compared to an uncorrected temperature sensor.

FIG. 13 is a plot illustrating the temperature errors of temperature output signals from the linearized temperature sensor of FIG. 12 as compared to an uncorrected temperature sensor. As can be observed from FIG. 13, the bowl shaped linearity error is corrected by the application of the correction factor Kp and the resulting digital temperature output values have a peak-to-peak error of 0.0847° C.

Figure 14:
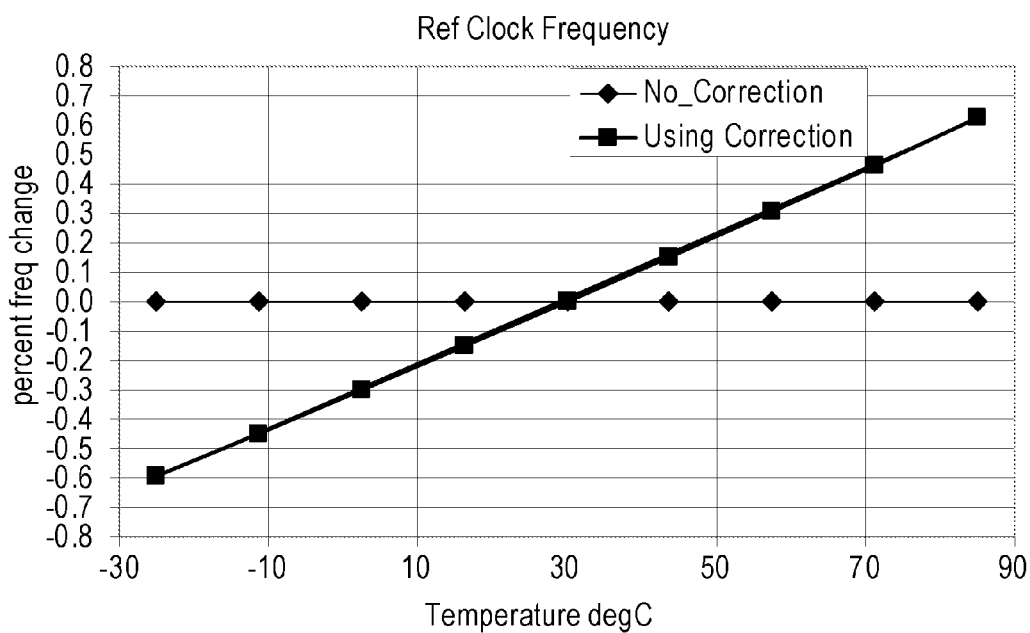
FIG. 14 is a plot illustrating the change in reference frequency in the frequency ratio digitizing temperature sensor of FIG. 12 when linearity correction is applied as compared to when no linearity correction is applied to the reference frequency.

FIG. 14 is a plot illustrating the change in reference frequency in the frequency ratio digitizing temperature sensor of FIG. 12 when linearity correction is applied as compared to when no linearity correction is applied to the reference frequency. In the input generation circuit of FIG. 12, the reference frequency is not stabilized. Thus, when linearity correction is not applied ("No_Correction"), the reference frequency is stable. However, when linearity correction is applied ("Using Correction") through the use of correction factor Kp, the reference frequency varies to a level of about 1.25% peak-to-peak over a temperature range of −25 to 85° C.

Figure 15A:
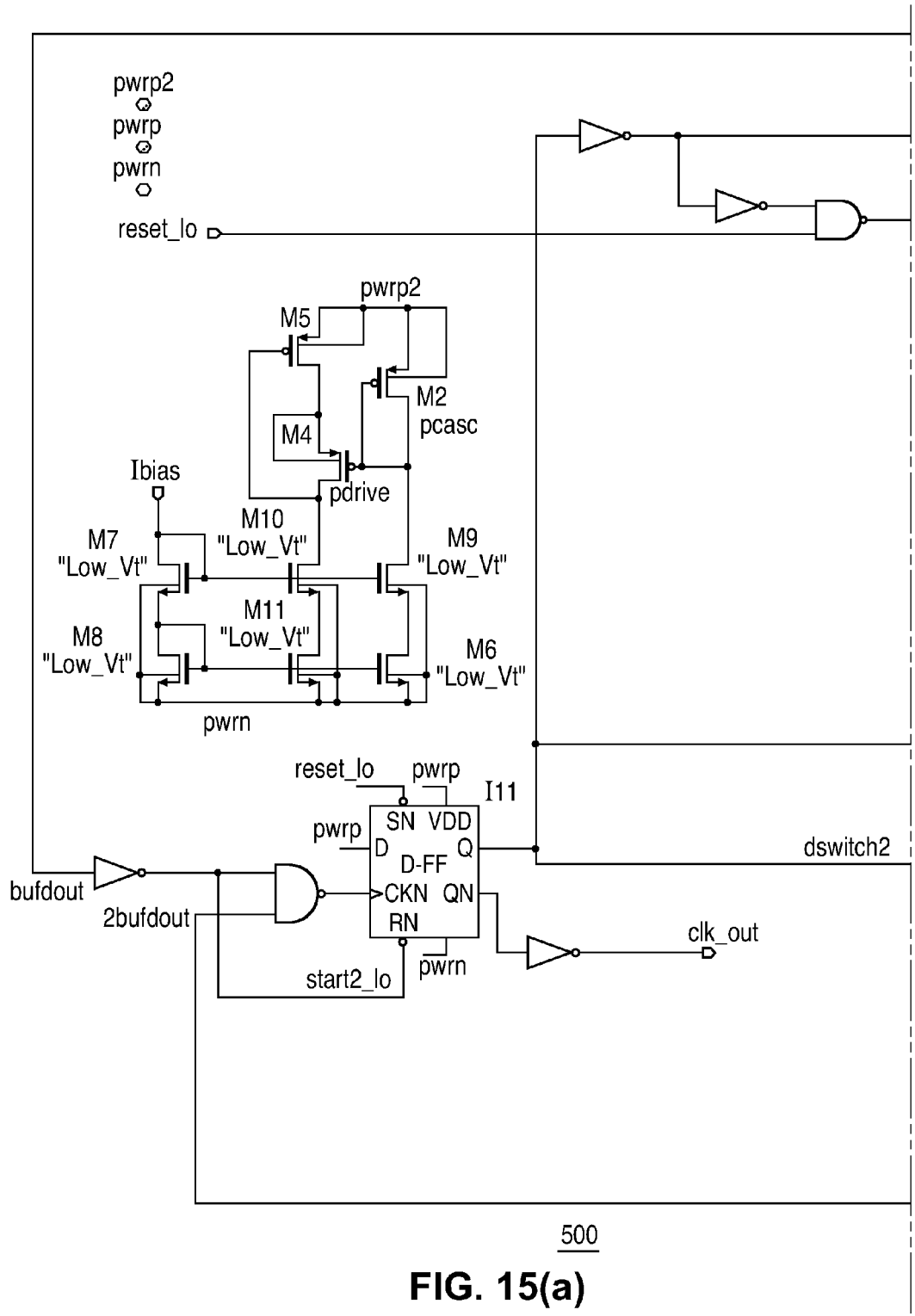
Figure 15B:
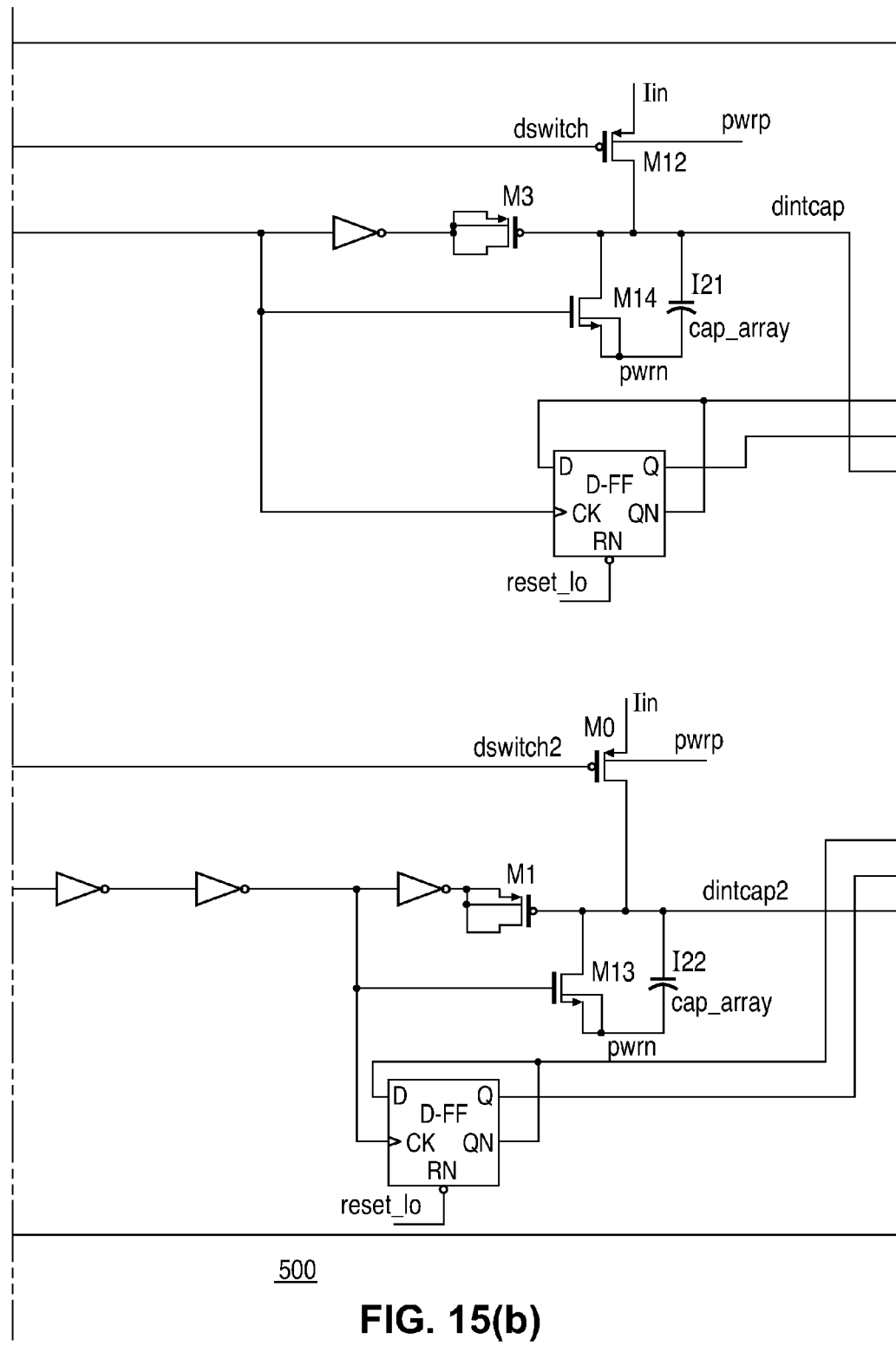
Figure 15C:
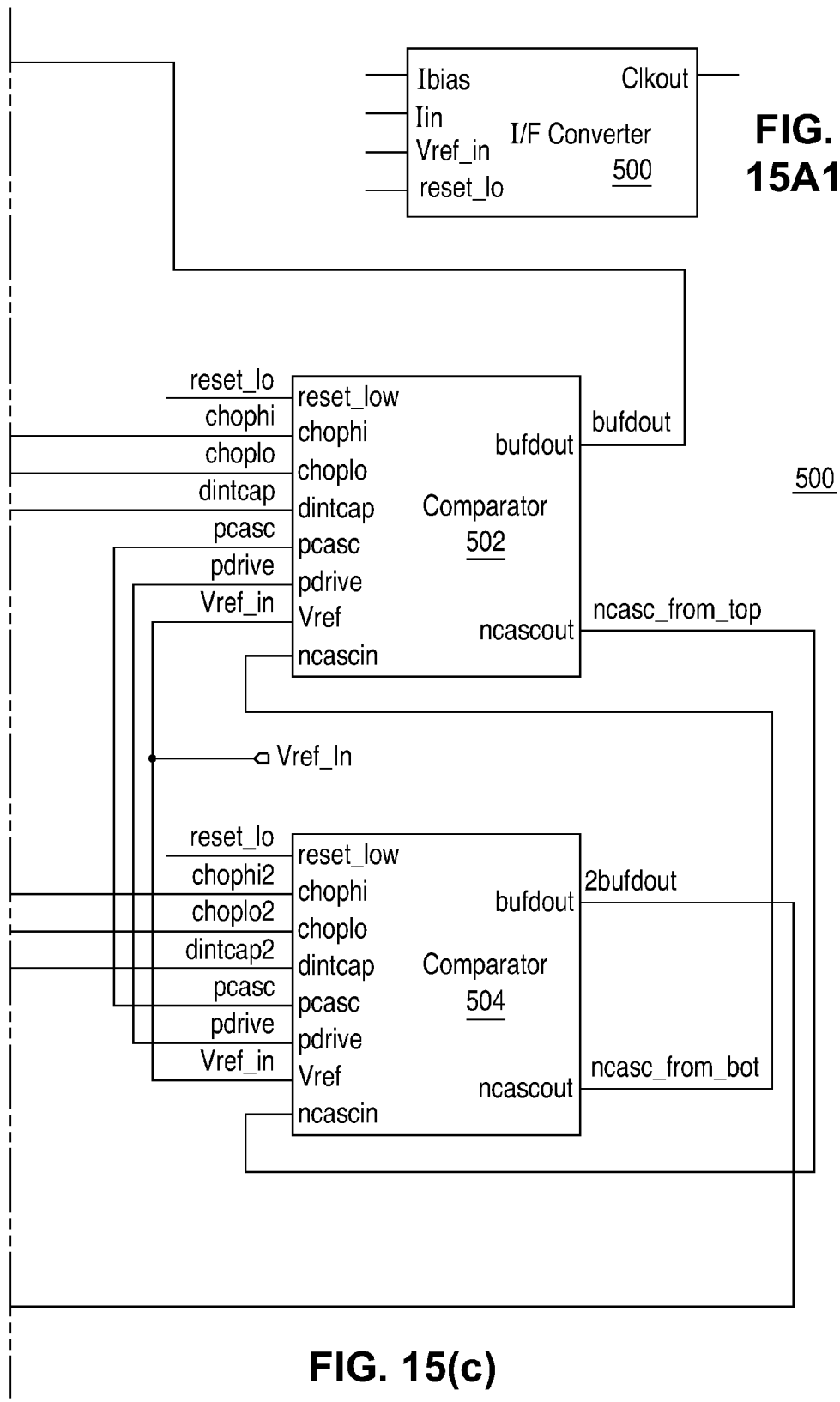

FIG. 15, which includes FIGS. 15(a), 15(b), 15(c) and 15A1, is a schematic diagram of a current-to-frequency (I/F) converter which can be used to implement the I/F converters in the frequency ratio digitizing temperature sensor of the present invention. While any I/F converters, conventional or to be developed, can be used in the frequency ratio digitizing temperature sensor of the present invention, the use of the I/F converter of FIG. 15 to implement the data and reference I/F converters provides particular advantages. Specifically, the I/F converter 500 of FIG. 15 ensures a sum of propagation, logic and switching time delays that is constant over temperature, fabrication processing and power supply variations. Furthermore, the delay time through the I/F converter is minimized while the variations in the delay time is also minimized. Finally, the sum of the delays through the I/F converter is implemented in a manner where the temperature performance of the input current Ibias controls the delays. Such delays are trimmable for optimum performance over temperature by trimming the temperature coefficient of current Ibias applied to the I/F converter.

Referring to insert FIG. 15A1, I/F converter 500 receives an input current Iin and an input reference voltage Vref and provides a clk_out signal as the frequency output signal. When applied to the temperature sensor of FIG. 1, the input current Iin is either the input current Idata or the reference current Iref and the input reference voltage is either the reference voltage Vdata or the reference voltage Vref, respectively. The clk_out signal is either the Fdata output signal or the Fref output signal, respectively. I/F converter 500 further receives a bias current Ibias as an input current and a reset_lo signal.

Referring to FIG. 15, I/F converter 500 includes a D-flip-flop I11 to control the charging of two capacitor arrays 121 and 122. D-flip-flop I11 operates to alternately apply the input current Iin to charge up one of the capacitor arrays. For instance, D-flip-flop I11 asserts the control signal "dswitch" to apply the input current to the upper capacitor array 121 and charge up the voltage at node "dintcap." The upper capacitor array 121 is charged until the voltage at node dintcap reaches the input reference voltage Vref_in level, whereby the upper comparator 502 asserts its output signal. Then D-flip-flop I11 asserts the control signal dswitch2 to apply the input current to the lower capacitor array 122 and charge up the voltage at node dintcap2. The lower capacitor array 122 is charged until the voltage at node dintcap2 reaches the input reference voltage Vref_in level, whereby the lower comparator 504 asserts its output signal. The output signals "bufdout" and "2bufdout" are coupled to logic gates to drive the D-flip-flop I11 to reset and clock the D-flip-flop.

Comparators 502 and 504 can be implemented in a conventional manner. In one embodiment, the comparator includes a capacitor that can be tuned for constant delay. Furthermore, the comparator implements a chopping scheme so that any offset voltage errors in the comparator are reversed in sign every other comparison cycle. In this manner, the average delay time of the comparator, and the entire I/F converter, is made insensitive to supply voltage or temperature variations.

The temperature coefficient of the bias current Ibias applied to I/F converter 500 can be trimmed so that the delay time in the comparators is very constant. Bias current Ibias is coupled to a current mirror to provide mirror voltage drive to the current source devices within comparators 502 and 504.

The switches (transistors M12, M0) which steer the input current Iin to either of the two charging capacitors 121 and 122) are not voltage switches but are implemented as current switches. The switches thus act like a differential pair being fed from the input current Iin. The input current Iin is steered to that path whose gate drive voltage is near ground. The steering device (switch M12 or M0) at the chosen capacitor array then acts like a grounded gate cascode, isolating the input current source Iin from the glitches generated at the comparator and providing a constant voltage (e.g., one PMOS gate-to-source Vgs voltage above ground) for the current source providing the input current Iin.

The devices M3 and M1 are used to first order cancel excess charge injected at the switching instant where the injected charge is temperature and supply voltage dependent. The rest of the logic circuits provides for a known state at reset.

In one embodiment, in order to enable I/F converter 500 to function at extremely low power supply voltages (such as down to 1.1 Volts and below), a low threshold voltage transistor device (denoted "Low_Vt" in FIG. 15) is used where appropriate to enable the low supply voltage operation.

RFID Temperature Logger

One of ordinary skill in the art, upon being apprised of the present description, would appreciate that the frequency ratio digitizing temperature sensor of the present invention has many applications in the electronics art. According to one aspect of the present invention, the frequency ratio digitizing temperature sensor of the present invention is incorporated in a radio frequency identification (RFID) transponder or tag to implement temperature logging capability in the RFID tag. The resultant RFID tag, also referred to as an RFID temperature logger, operates to measure and store ambient temperature values where the measurement intervals can be pre-programmed or programmed on demand. The temperature measurements are stored in the RFID temperature logger and can be read out as needed. In this manner, an RFID tag incorporating temperature measurement capability is realized.

In one embodiment, the RFID temperature logger is implemented as a semi-passive RFID tag. Being a semi-passive RFID tag, part of the circuitry of the RFID tag is powered by a battery external to the RFID tag. The semi-passive RFID tag includes an RF communication block, a control logic block, and a sensor block incorporating the frequency ratio digitizing temperature sensor of the present invention. In the present embodiment, the control logic block and the sensor block are battery powered, while the RF communication block is self powered from the incident RF signal. According to one aspect of the present invention, the sensor block is configured as a dual function temperature/voltage sensor for measuring both the ambient temperature and the battery voltage.

In a further embodiment, the 3-port linearity correction method is employed in the frequency ratio digitizing temperature sensor so that the sensor block provides a stable reference clock which can be used for calibrating the real time clock of the control logic block, as will be described in more detail below.

Figure 16:
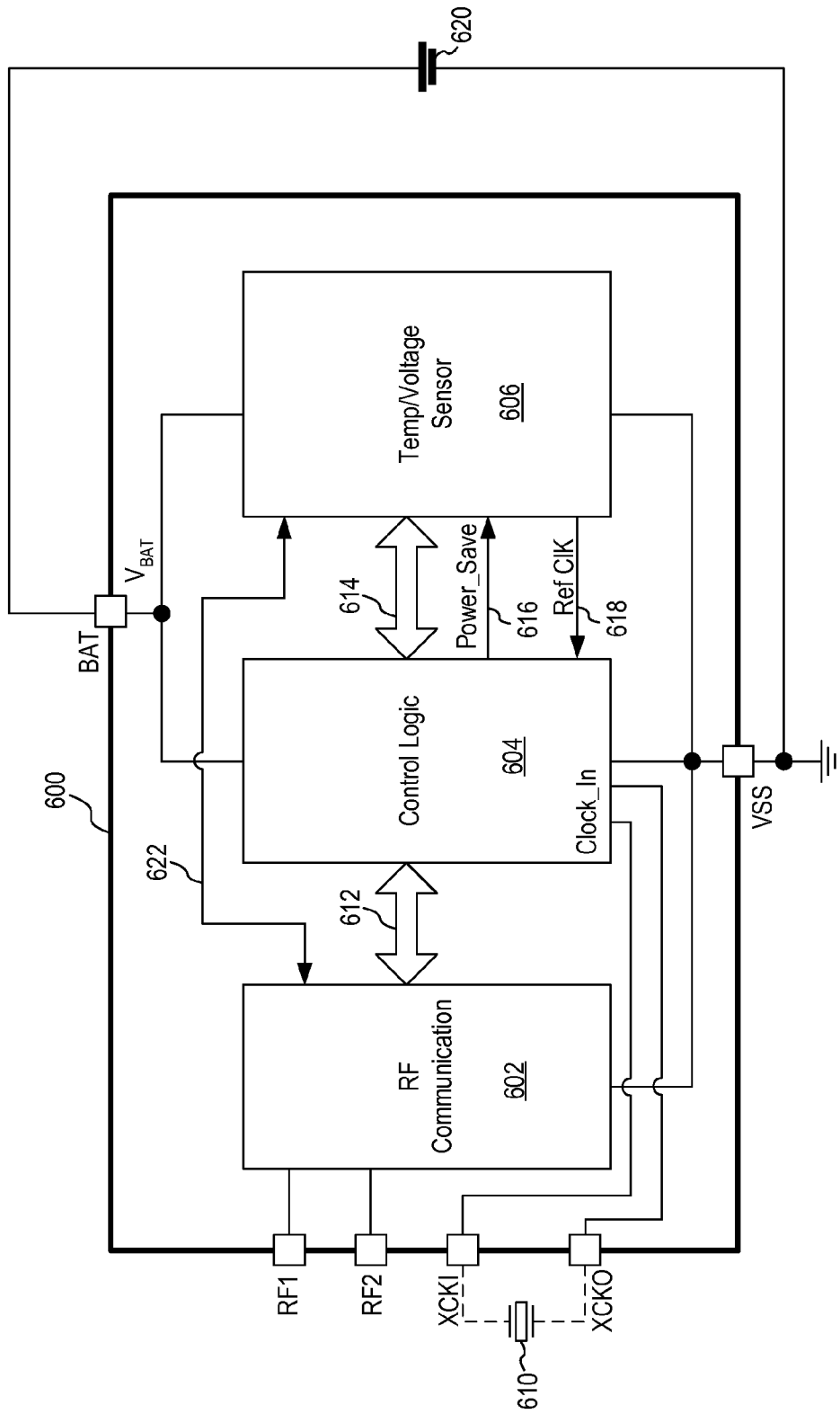
FIG. 16 is a schematic diagram of an RFID temperature logger according to one embodiment of the present invention.

FIG. 16 is a schematic diagram of an RFID temperature logger according to one embodiment of the present invention. Referring to FIG. 16, an RFID temperature logger 600 includes a RF communication block 602, a control logic block 604 and a temperature/voltage sensor block 606 (hereinafter "sensor block"). RFID temperature logger 600 is semi-passive and is coupled to an external battery 620 to receiver power for supplying the control logic block 604 and the sensor block 606. The battery 620 is coupled across a BAT terminal and the ground terminal of temperature logger 600 and provides a battery voltage $V_{BAT}$ to the control logic and sensor blocks.

RFID temperature logger 600 also includes crystal pins XCKI and XCKO to which a crystal oscillator 610 can be coupled. Crystal oscillator 610 provides a reference frequency for the control logic block 604. Crystal oscillator 610 is optional and may be omitted in temperature logger 600 as the sensor block 606 is capable of providing a stable reference frequency, as will be described in more detail below.

In the present embodiment, the RF communication block 602 is coupled to a first RF port RF1 and a second RF port RF2 for receiving incident RF signals detected by an antenna (not shown). The RF communication block 602 communicates with the control block 604 over a bus 612 to read or write data stored in the control logic block 604 as commanded by the incident RF signals. The RF communication block 602 also communicates with the sensor block 606 on a bus 622. Sensor block 606 communicates over a bus 614 with the control logic block 604. Control logic block 604 provides control signals to initiate temperature or voltage measurement functions at sensor block 606 and sensor block 606 provides measured temperature or voltage data for storage in control logic block 604.

According to one aspect of the present invention, sensor block 606 also provides a stable reference clock on a bus 618 to control logic block where the stable reference clock is used for calibration of the real time clock in the control logic block. In this manner, no external crystal oscillator is required for RFID temperature logger 600 to operate. According to another aspect of the present invention, the control logic block 604 provides a power_save signal on a bus 616 to the sensor block 606 to cause the sensor block 606 to power off to conserve power, as will be described in more detail below.

In one embodiment, the RF communication block 602 is implemented as a EPC class 0+ compliant RFID communication core for providing RF communication through first and second RF ports RF1 and RF2. The RF communication block 602 includes embedded state machines to implement communication to and from the control logic block 604 as well as communication to and from the sensor block 606. In one embodiment, the sensor data provided by the sensor block 606 and commands and instructions to be sent to the sensor block 606 are carried through the wireless RF link received and detected by the RF communication block 602. The data and commands intended for sensor block 606 are passed through bus 622 to and from sensor block 606.

In one embodiment, the wireless RF link is at a frequency of 900 MHz and supports a data rate from 16 KBps to 80 KBps. Forward link communication from the RFID reader to the RFID temperature logger 600 is through amplitude modulated RF at a modulation depth between 30% to 100%. Back link communication from the RFID temperature logger 600 to the RFID reader is through passive backscatter. As described above, the RFID communication block 602 does not receive battery power but instead is powered through the incident RF on the antenna.

The control logic block 604 includes registers and memory for storing commands received from RF communication block 302 and also for storing temperature or voltage data provided by sensor block 606. The control logic block 604 operates to control the operation of the RFID tag 600. Control logic block 604 receives battery power from the external battery 620. In the present illustration, the control logic block 604 includes a pair of input terminal Clock_In for receiving an input clock signal from an external crystal oscillator 610. The input clock signal enables the control logic to synchronize its real time clock. However, the Clock_In terminals and the external crystal oscillator 610 are optional and may be omitted in other embodiments of the present invention. In particular, crystal oscillator 610 is not needed when the sensor block 606 provides the stable reference clock on bus 618.

In one embodiment, the control logic block 604 operates to command or initiate temperature measurements by sensor block 606. The temperature measurement can include user selected intervals from 1 second to 8 hours. Initiation of temperature logging can be upon power up, only at high or low temperature trip points or after a certain delay time. Furthermore, in one embodiment, the control logic block 604 includes memory to store up to 4000 temperature measurement at 8-bit per sample. The control logic block can also be programmed to record measured minimum and maximum temperatures during each measurement session and provide warning signal if the temperature measurements exceed certain preprogrammed levels.

The control logic block 604 also controls the sensor block 606 to measure the battery voltage and conserve battery power. When sensor block 606 is not taking temperature measurements, control logic block 604 instructs sensor block 606 to power down to conserve battery power. The control logic block 604 also wakes up sensor block 606 for a measurement session. Upon completion of the measurement session, the control logic block 604 turns off its internal clock signal to power down the sensor block 606 and also its own internal circuitry. In one embodiment, when measurements are not being taken, control logic block 604 powers off the sensor block and all of its own circuitry except for the data memory. In this manner, power consumption is reduced to a minimum level and the battery power can be extended for a longer life.

In the present embodiment, the sensor block 606 measures the battery voltage $V_{BAT}$ as well as the ambient temperature. From the battery voltage measurements provided by sensor block 606, control logic block 604 can determine if the battery power is low. If the battery power is low, control logic block 604 issues power_save command on bus 616 to power down sensor block 606 so that remaining battery power can be conserved. In one embodiment, the power_save command causes the battery power to be disconnected from the sensor block 606 so that no more battery power is consumed. In another embodiment, when the battery power is at a critical level, control logic block 604 and sensor block 606 will be powered down except for the data memory and the remaining battery power will be used to sustain the data memory in order to preserve the measurement data.

Figure 17:
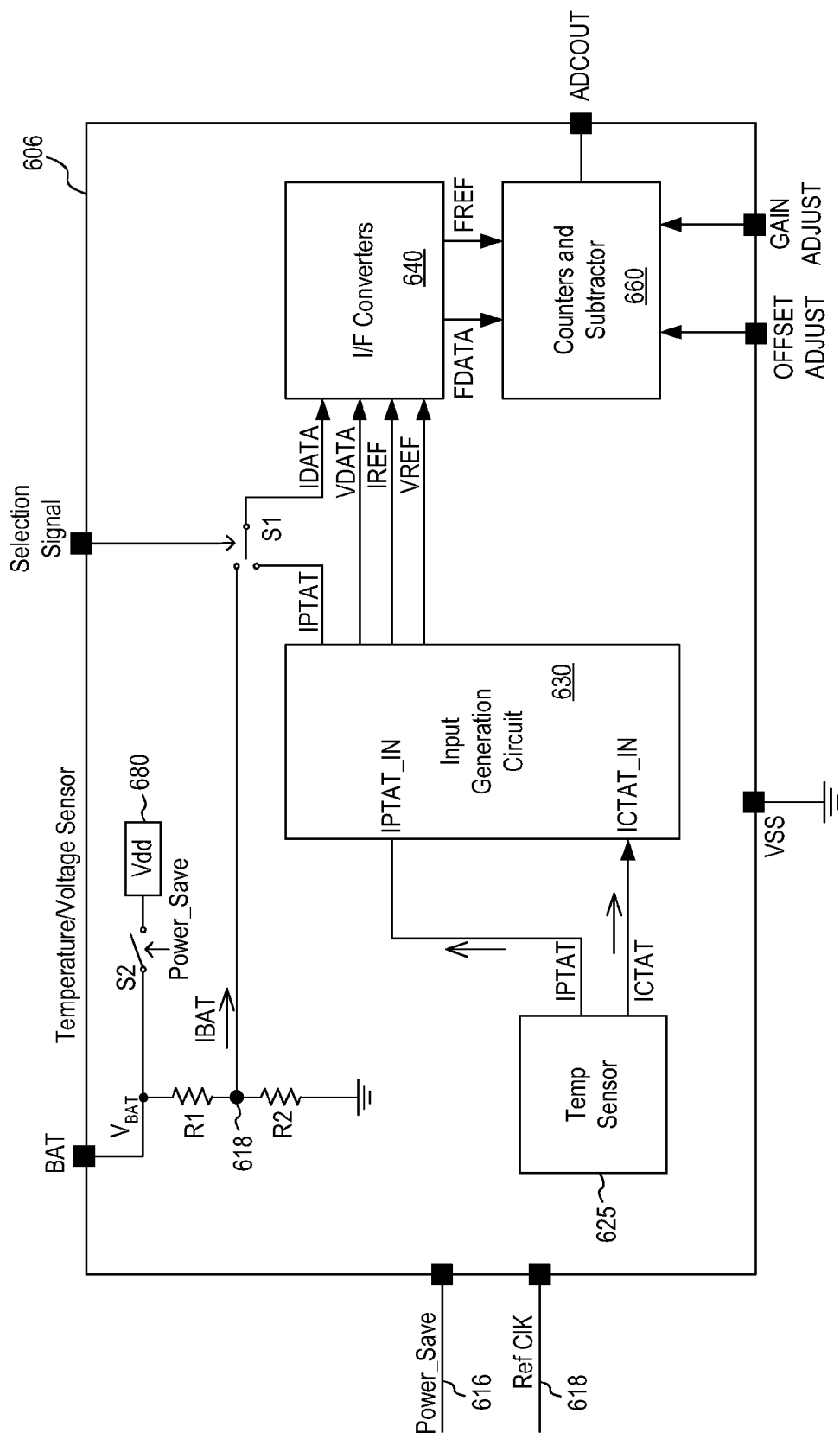
FIG. 17 is a schematic diagram of a temperature/voltage sensor block which can be incorporated in the RFID temperature logger of FIG. 16 according to one embodiment of the present invention.

For instance, as shown in FIG. 17, the battery voltage $V_{BAT}$ is connected through a switch S2 to the power supply voltage Vdd node 680 for the temperature/voltage sensor block 606. The power supply voltage Vdd node 680 represents the power supply voltage being coupled to supply the circuitry in the sensor block. The switch S2 is controlled by the power_save signal. When the power_save signal is not asserted to indicate a good battery power condition, switch S2 is closed to allow the battery power to be coupled to the power supply voltage node 680 of the sensor block 606. When the power_save signal is asserted to indicate a lower battery power condition, switch S2 is open to disconnect the battery voltage from the sensor block.

The temperature/voltage sensor block 606 will now be described in detail. FIG. 17 is a schematic diagram of a temperature/voltage sensor block which can be incorporated in the RFID temperature logger of FIG. 16 according to one embodiment of the present invention. Referring to FIG. 17, sensor block 606 is configured to measure ambient temperature as well as the battery voltage $V_{BAT}$. Sensor block 606 is powered by the external battery 620. In one embodiment, the sensor block 606 is designed to run from a 1.55V silver oxide coin cell battery and functions to provide accurate temperature and voltage measurements over $-25°$ C. to $85°$ C., even as the battery discharges below 1.1 volts.

Temperature/voltage sensor block 606 implements the frequency ratio digitizing temperature sensor architecture described above with reference to FIGS. 1-15. However, in accordance with the present invention, the sensor block 606 is configured to measure both temperature and voltage using the same digitizer circuitry. To implement the temperature measurement function, sensor block 606 includes a temperature sensor 625 providing a PTAT current (IPTAT) and a CTAT current (ICTAT) to the temperature digitizer circuitry, as described above with reference to FIG. 1. The CTAT current ICTAT is provided to the ICTAT_IN input terminal of an input generation circuit 630 while the PTAT current IPTAT is provided to the IPTAT_IN input terminal of input generation circuit 630.

To implement the voltage measurement function, sensor block 606 uses a resistor divider including resistors R1 and R2. The resistor divider is connected to the battery voltage terminal BAT and the ground potential to receive the battery voltage $V_{BAT}$. A current IBAT, indicative of the battery voltage, is provided on a node 618. The resistance of resistors R1 and R2 are selected to establish a desired slope of current IBAT. The current IBAT is provided to a switch S1 to be switchably connected to the frequency ratio digitizer circuitry in sensor block 606, as will be described in more detail below.

The frequency ratio digitizer circuitry of sensor block 606 is implemented in the same manner as described above with reference to FIGS. 1-15. Specifically, the digitizer circuitry includes the input generation circuit 630 and a frequency ratio analog-to-digital converter (ADC). Input generation circuit 630 receives the two temperature dependent currents IPTAT and ICTAT. Input generation circuit 630 generates the necessary input signals IDATA, VDATA, IREF and VREF for driving the frequency ratio ADC. The operation of input generation circuit 630 for generating the current and voltage signals IDATA, VDATA, IREF and VREF is the same as that described above with reference to FIGS. 1-15. In the present embodiment, the frequency ratio ADC includes current-to-frequency (I/F) converters 640 and counters and subtract circuit 660. Counters and subtract circuit 660 may receive offset adjust and gain adjust signals from the control logic block. The frequency ratio ADC provides an output signal ADCOUT as the measurement output signal of the frequency ratio digitizer.

The signal IDATA provided to I/F converters 640 represents the data signal to be digitized into the measurement output signal ADCOUT. Thus, when temperature measurement is to be taken, the signal IDATA is the temperature dependent PTAT current IPTAT. When battery voltage measurement is to be taken, the signal IDATA is the voltage dependent current IBAT. In accordance with dual function temperature/voltage measurement scheme of the present invention, the voltage dependent current IBAT and the temperature dependent current IPTAT are coupled to switch S1 to be alternately coupled to the frequency ratio ADC. Switch S1 receives a selection signal provided by the control logic block 604 on bus 614 and selects either the current IPTAT or the current IBAT to be coupled as the signal IDATA to I/F converters 640 for digital conversion. In this manner, the digitizer circuitry of sensor block 606 provides an ADCOUT signal that is indicative of either the temperature measurement or the voltage measurement that is coupled as the IDATA signal to the I/F converters.

With the measured battery voltage values, the control logic block 604 can determine if there is sufficient battery power to continue temperature measurement operations. In one embodiment, the sensor block 606 is operated only when the battery voltage is above 1.1 volts. Therefore, when the battery voltage measurement provided by sensor block 606 indicates that the battery voltage is less than 1.1 volts, the control logic block 604 issues the power_save signal to shut down the sensor block 606.

In FIG. 17, the selection signal, the offset adjust and the gain adjust signals and the ADCOUT output signal are communicated on bus 614 between the control logic block 604 and the sensor block 606. In one embodiment, in order to conserve battery power, most of the digitizer circuitry are configured be shut down between measurement conversions, while keeping the interface circuits between the sensor block and the logic control block powered up with near zero quiescent power drain as the interface circuits are required for restarting the sensor block when measurements are to be taken again.

One feature of the dual function temperature/voltage sensor of the present invention is that the sensor is configured so that the temperature and voltage measurements share the same offset and gain adjust values for the digitizer circuitry. Specifically, the PTAT current IPTAT at a selected temperature measurement point (such as 0° C.) is set to be the same as the battery current IBAT at a selected voltage measurement point (such as 1.5 volts). In this manner, the voltage measurement offset and gain adjust values track with the temperature measurements and only one set of offset and gain adjust values is required for both measurements.

As described above, when the frequency ratio digitizing temperature sensor of the present invention implements the 3-port linearity correction method, the frequency ratio digitizing temperature sensor provides a stabilized reference clock frequency, while still minimizing temperature digitization linearity errors. The stabilized reference clock frequency can be used for clock calibration. Thus, in accordance with the present invention, sensor block 606 is configured to implement the 3-port linearity correction method and a reference clock signal is provided on bus 618. The reference clock signal can then be provided to the control logic block 604 for use to calibrate the clock signal of the control logic block.

Figure 18:
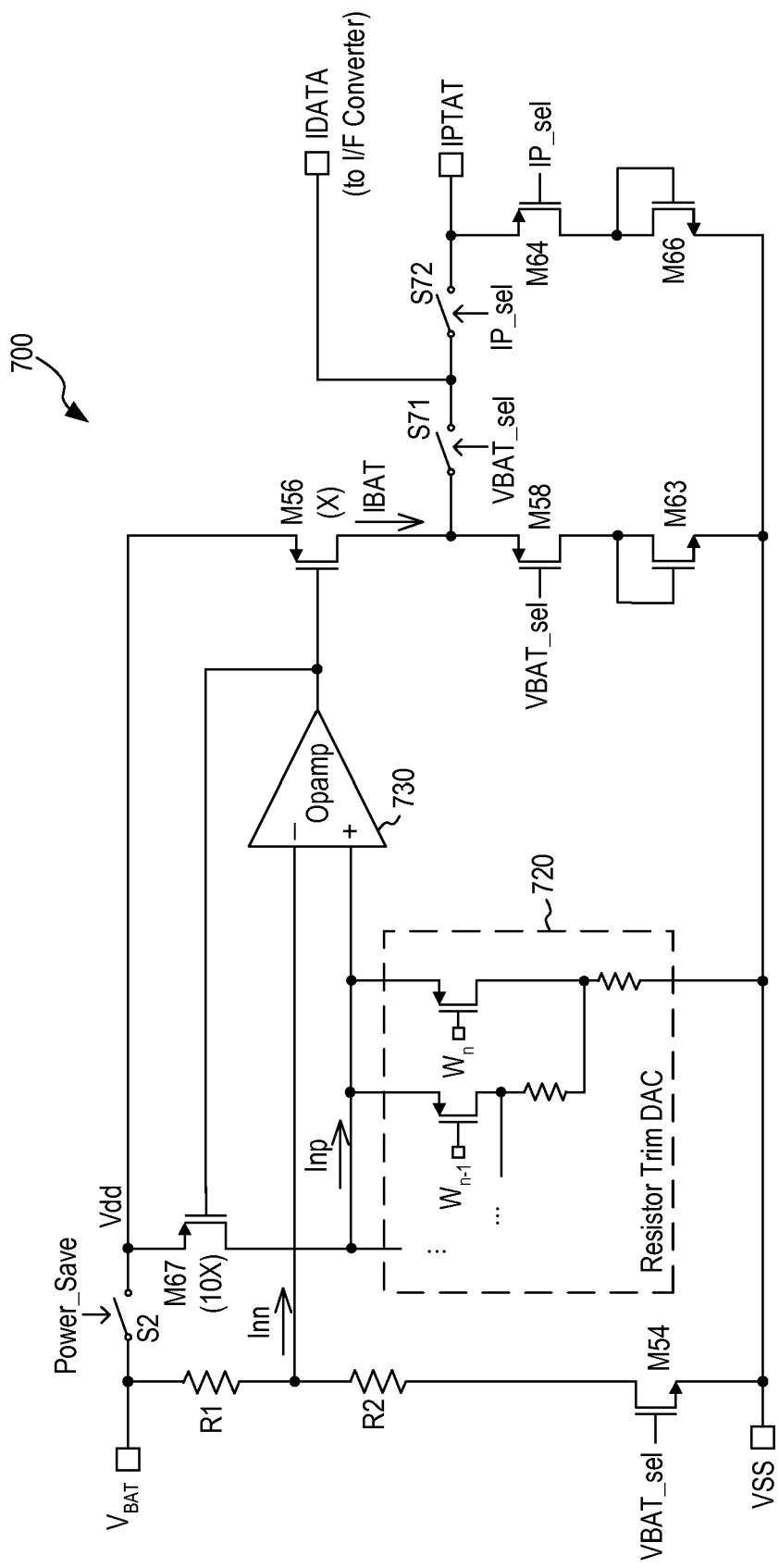
FIG. 18 is a circuit diagram of battery voltage and PTAT current selection circuit which can be incorporated in the temperature/voltage sensor block of FIG. 17.

FIG. 18 is a circuit diagram of battery current and PTAT current selection circuit which can be incorporated in the temperature/voltage sensor block of FIG. 17. The battery current generation circuit and the battery current and PTAT current selection circuit illustrated in FIG. 17 are simplified to illustrate the operating principles of temperature/voltage sensor block 606. FIG. 18 illustrates an actual implementation of a battery current and PTAT current selection circuit 700 which can be used to generate a current indicative of the battery voltage and to selectively couple the battery current or the temperature dependent PTAT current to the I/F converters as the input signal IDATA.

Referring to FIG. 18, in circuit 700, the battery voltage $V_{BAT}$ is coupled to a resistor divider formed by resistors R1 and R2. The battery voltage $V_{BAT}$ is also coupled through a switch S2, controlled by the power_save signal, to the power supply voltage Vdd node. Therefore, in circuit 700, except for the resistor divider of resistors R1 and R2 (and associated transistor M54), all circuitry are connected to the power supply Vdd voltage so that all circuitry can be disconnected from the battery power when the power_save signal is asserted, as described above.

To measure the battery voltage, the pair of serially connected resistors R1 and R2 is connected between the battery voltage $V_{BAT}$ and the ground voltage VSS to form the resistor divider. An NMOS transistor M54, controlled by a VBAT_sel signal, is coupled between resistor R2 and VSS to connect the resistor divider when battery voltage measurement is selected or to disconnect the resistor divider when battery voltage measurement is not selected. Transistor M54 is controlled by a VBAT_sel signal which is asserted when battery voltage measurement is selected. In operation, transistor M54 is used to disconnect the DC current path of the battery current through resistors R1 and R2 so that the battery power is not drained when battery voltage measurements are not taken. Transistor M54 is designed to have a very large width over length ratio so that only a small voltage drop is incurred across transistor M54. That is, when transistor M54 is turned on, the resistance across the transistor is negligible as compared to the resistance values of resistors R1 and R2.

The resistor divider of resistors R1 and R2 provides a current Inn which is coupled to a first input terminal of an operational amplifier (opamp) 730. Opamp 730 is configured in a feedback loop where the output terminal of opamp 730 is coupled to drive a PMOS transistor M67. PMOS transistor M67 has a source terminal coupled to the battery voltage $V_{BAT}$ and provides a current Inp at its drain terminal to the second input terminal of opamp 730. The output terminal of opamp 730 is also coupled to drive a PMOS transistor M56 for providing a drain current IBAT indicative of the battery voltage $V_{BAT}$. Transistor M67 is 10 times that of transistor M56 so that the input currents Inn and Inp can have large current values while the output current IBAT at transistor M56 remains at a small current level. Specifically, by using a transistor ratio of 10:1 for transistors M67 and M56, the resistance values for resistors R1 and R2 can be kept small as currents Inn and Inp can have larger values. That is, it is not necessary to use large resistance values for resistors R1 and R2 in order to obtain smaller current values for currents Inn and Inp. Even when the resistance values of resistors R1 and R2 are small and the input currents Inn and Inp are large, the output current IBAT at transistor M56 remains small by the use of the ratioed transistors M67/M56. In one embodiment, the currents Inn and Inp are in the range of 20 µA and the current IBAT is in the range of 2 µA.

In another embodiment, opamp 730 implements a chopper scheme to minimize offset voltage errors between the first and second input terminals.

In the present embodiment, the accuracy of the battery voltage measurement is ensured by use of a resistor trim digital-to-analog-converter (DAC) 720. More specifically, fabrication process variations can result in variations of the resistance values for resistors R1 and R2. The variation in the resistance values is trimmed by resistor trim DAC 720 so that the battery current IBAT is insensitive to fabrication process variations. In the present illustration, resistor trim DAC includes a PMOS transistor coupled to each trim resistor. A series of trim transistor-resistor pair is provided to allow precise trimming of the resistance values of resistors R1 and R2. One or more transistors are turned on by the trimming program code $W_0$ to $W_n$ to select one or more trim resistors. The structure of the resistor trim DAC is illustrative only and other trim circuit configurations can be used in other embodiments of the present invention. Furthermore, resistor trim DAC 720 is optional and can be omitted in other embodiments of the present invention.

The battery current IBAT, generated by opamp 730 in conjunction with PMOS transistor M56, and the temperature dependent PTAT current IPTAT are switchably connected to the I/F converters 640 as the input signal IDATA. In the present embodiment, the battery current IBAT is coupled through a switch S71 to the IDATA terminal while current IPTAT is coupled through a switch S72 to the IDATA terminal. Switch S71 is controlled by the VBAT_sel signal while switch S72 is controlled by a IP_sel signal. The VBAT_sel signal and the IP_sel signal are complementary and non-overlapping signals. When the VBAT_sel signal is asserted, the IP_sel signal is deasserted so that battery current IBAT is coupled to the IDATA terminal. When the VBAT_sel signal is deasserted, the IP_sel signal is asserted so that the PTAT current IPTAT is coupled to the IDATA terminal.

When the battery current or the PTAT current is not being applied, the current is passed to an alternate path to ground so that the unused current does not affect the operation of the sensor block. In the present embodiment, a PMOS transistor M58 and a diode-connected NMOS transistor M63 provides the alternate current path for the battery current IBAT. When the VBAT_sel signal is deasserted, transistor M58 is turned on to drain the battery current IBAT through transistor M63 to the ground node VSS. Transistor M58 is open circuit when VBAT_sel signal is asserted so that all of the battery current is directed through switch S71 to the IDATA terminal.

At the PTAT current side, a PMOS transistor M64 and a diode-connected NMOS transistor M66 provides the alternate current path for the PTAT current IPTAT. When the IP_sel signal is deasserted, transistor M64 is turned on to drain the current IPTAT through transistor M66 to the ground node VSS. Transistor M66 is open circuit when IP_sel signal is asserted so that all of the PTAT current is directed through switch S72 to the IDATA terminal.

The RFID temperature logger of the present invention as described above realizes an RFID with temperature measurement functions as well as battery voltage monitoring function. The RFID temperature logger can further be implemented with reduced component count as an external crystal oscillator is not required. The RFID temperature logger achieves battery efficiency by powering down all digital circuitry when measurements are not being taken. The RFID temperature logger of the present invention enables ready and easy applications in RFID systems.

The above detailed descriptions are provided to illustrate specific embodiments of the present invention and are not intended to be limiting. Numerous modifications and variations within the scope of the present invention are possible. The present invention is defined by the appended claims.

We claim:

1. A semi-passive radio frequency identification (RFID) tag, the RFID tag being coupled to a battery providing a battery voltage for powering a part of the circuitry of the RFID tag, comprising:

an RF communication block receiving and transmitting RF signals;

a sensor block comprising a frequency ratio digitizing temperature sensor for alternately measuring the ambient temperature and the battery voltage; and a control logic block in communication with the RF communication block and the sensor block, the control logic controlling the operation of the RF communication block and the sensor block and storing temperature and voltage measurement data generated by the sensor block, wherein the control logic block operates based on a system clock and the sensor block provides a reference clock to the control logic block for use in calibrating the system clock of the control logic block.

2. The semi-passive radio frequency identification tag of claim 1, wherein the frequency ratio digitizing temperature sensor comprises:

a temperature sensing circuit providing a current proportional to absolute temperature ("PTAT current") and a second current complementary to absolute temperature ("CTAT current");

a battery voltage measurement circuit providing a battery current proportional to the battery voltage;

an input generation circuit coupled to the temperature sensing circuit to receive the PTAT current and the CTAT current, the input generation circuit generating a first current from the weighted sum of the PTAT current and the CTAT current, the first current being first order temperature independent, the input generation circuit further generating a first corrected current being the sum of the first current and a first portion of the PTAT current, the input generation circuit providing a first output current indicative of the PTAT current, a first output voltage generated by applying the first corrected current to a first resistor, a second output current indicative of the first corrected current, and a second output voltage generated by applying the first current to a second resistor;

a selection circuit receiving the first output current and the battery current and selecting one of the first output current and the battery current as a selected current based on a selection signal; and a frequency ratio analog-to-digital converter including a data oscillator receiving the selected current and the first output voltage and a reference oscillator receiving the second output current and the second output voltage, the frequency ratio analog-to-digital converter generating a linearity-corrected digital output signal indicative of the selected one of the PTAT current and the battery current.

3. The semi-passive radio frequency identification tag of claim 2, wherein the frequency ratio analog-to-digital converter comprises:

a first current-to-frequency converter as the data oscillator receiving the selected current and the first output voltage from the input generation circuit and providing a first frequency output signal indicative of the selected current;

a second current-to-frequency converter as the reference oscillator receiving the second output current and the second output voltage from the input generation circuit and providing a second frequency output signal being a reference frequency;

a first counter circuit receiving the first frequency output signal and generating a first digital count value indicative of the number of clock cycles of the first frequency output signal over a conversion period;

a second counter circuit receiving the second frequency output signal and generating a second digital count value indicative of the number of clock cycles of the second frequency output signal, wherein the conversion period is defined by a predetermined number of the clock cycles of the second frequency output signal; and a subtract circuit subtracting the second digital count value from the first digital count value, the subtract circuit providing the digital output signal.

4. The semi-passive radio frequency identification tag of claim 2, wherein the first output current is a duplicate copy of the PTAT current and the first corrected current or a duplicate copy of the first corrected current is applied to the first resistor for generating the first output voltage.

5. The semi-passive radio frequency identification tag of claim 4, wherein the first corrected current or a duplicate copy of the first corrected current is applied as the second output current.

6. The semi-passive radio frequency identification tag of claim 4, wherein the input generation circuit further comprises:
a first summing circuit coupled to sum a second portion of the PTAT current and a third portion of the CTAT current to generate the first current, the first current having a nonlinear characteristic over temperature; and
a second summing circuit coupled to sum the first current and the first portion of the PTAT current to generate the first corrected current, the first portion being a small fraction of the PTAT current.

7. The semi-passive radio frequency identification tag of claim 6, wherein the input generation circuit further comprises a first buffer receiving the PTAT current and applying a first correction factor to the PTAT current to generate the first portion of the PTAT current.

8. The semi-passive radio frequency identification tag of claim 7, wherein the first correction factor has a value less than 0.15.

9. The semi-passive radio frequency identification tag of claim 7, wherein the input generation circuit further comprises a second buffer receiving the first current and applying a second correction factor being one minus the first correction factor to the first current to generate a normalized first current, the second buffer providing the normalized first current to the second summing circuit to be summed with the first portion of the PTAT current.

10. The semi-passive radio frequency identification tag of claim 2, wherein the input generation circuit further generates a second corrected current being the sum of the first current and a fourth portion of the PTAT current, the fourth portion being different than the first portion, the input generation circuit generating the second output voltage by applying the second corrected current to the second resistor.

11. The semi-passive radio frequency identification tag of claim 10, wherein the control logic block operates based on a system clock and the second output voltage and the second output current are used to generate a reference clock to be coupled to the control logic block for use in calibrating the system clock.

12. The semi-passive radio frequency identification tag of claim 10, wherein the input generation circuit further comprises:
a first summing circuit coupled to sum a second portion of the PTAT current and a third portion of the CTAT current to generate the first current, the first current having a nonlinear characteristic over temperature;
a second summing circuit coupled to sum the first current and the first portion of the PTAT current to generate the first corrected current, the first portion being a small fraction of the PTAT current; and
a third summing circuit coupled to sum the first current and the fourth portion of the PTAT current to generate the second corrected current, the fourth portion being a small fraction of the PTAT current and being different than the first portion.

13. The semi-passive radio frequency identification tag of claim 12, wherein the input generation circuit further comprises:
a first buffer receiving the PTAT current and applying a first correction factor to the PTAT current to generate the first portion of the PTAT current; and
a second buffer receiving the PTAT current and applying a second correction factor to the PTAT current to generate the fourth portion of the PTAT current.

14. The semi-passive radio frequency identification tag of claim 13, wherein the input generation circuit further comprises:
a third buffer receiving the first current and applying a third correction factor being one minus the first correction factor to the first current to generate a first normalized first current, the third buffer providing the first normalized first current to the second summing circuit to be summed with the first portion of the PTAT current; and
a fourth buffer receiving the first current and applying a fourth correction factor being one minus the second correction factor to the first current to generate a second normalized first current, the fourth buffer providing the second normalized first current to the third summing circuit to be summed with the fourth portion of the PTAT current.

15. The semi-passive radio frequency identification tag of claim 2, wherein the battery voltage measurement circuit comprises:
a first resistor and a second resistor connected in series between the battery voltage and a first node, a common node between the first resistor and the second resistor providing a third output current indicative of the battery voltage;
a first transistor having a first current handling terminal coupled to the first node, a second current handling terminal coupled to a ground voltage and a control terminal coupled to receive a first selection signal, the first selection signal being asserted when a battery voltage measurement is to be taken;
an operational amplifier having an first input terminal coupled to receive the third output current and a second input terminal, and an output terminal;
a second transistor having a first current handling terminal coupled to the battery voltage, a second current handling terminal coupled to the second input terminal of the operational amplifier and a control terminal coupled to the output terminal of the operational amplifier, the second transistor providing a fourth output current to the operational amplifier; and
a third transistor having a first current handling terminal coupled to the battery voltage, a second current handling terminal providing the battery current proportional to the battery voltage and a control terminal coupled to the output terminal of the operational amplifier.

16. The semi-passive radio frequency identification tag of claim 15, wherein the battery voltage measurement circuit further comprises:
a resistor trim digital-to-analog converter (DAC) coupled to the second input terminal of the operational amplifier, the resistor trim DAC being provided to modify the fourth output current in response to a trimming program code for improving the accuracy of the resistance values of the first and second resistors.

17. The semi-passive radio frequency identification tag of claim 2, wherein the selection circuit comprises:
- a first switch receiving the battery current and switchably coupling the battery current to a second node, the first switch being controlled by a first selection signal, the first selection signal being asserted when a battery voltage measurement is to be taken;
- a second switch receiving the PTAT current and switchably coupling the PTAT current to the second node, the second switch being controlled by a second selection signal, the second selection signal being asserted when a temperature measurement is to be taken;
- a fourth transistor having a first current handling terminal coupled to receive the battery current, a second current handling terminal coupled to a third node and a control terminal coupled to receive the first selection signal;
- a fifth transistor having a first current handling terminal coupled to the control terminal and to the third node and a second current handling terminal coupled to the ground voltage;
- a sixth transistor having a first current handling terminal coupled to receive the PTAT current, a second current handling terminal coupled to a fourth node and a control terminal coupled to receive the second selection signal; and
- a seventh transistor having a first current handling terminal coupled to the control terminal and to the fourth node and a second current handling terminal coupled to the ground voltage,
- wherein the first switch and the second switch, under the control of the first and second selection signals, operation to provide one of the battery current and the PTAT current as the selected current at the second node.

18. The semi-passive radio frequency identification tag of claim 17, wherein the first selection signal and the second selection signal are complementary and non-overlapping signals.

* * * * *

UNITED STATES PATENT AND TRADEMARK OFFICE
CERTIFICATE OF CORRECTION

| | | |
|---|---|---|
| PATENT NO. | : 7,474,230 B2 | Page 1 of 1 |
| APPLICATION NO. | : 11/425381 | |
| DATED | : January 6, 2009 | |
| INVENTOR(S) | : Eric D. Blom, Jun Wan and Stuart H. Urie | |

It is certified that error appears in the above-identified patent and that said Letters Patent is hereby corrected as shown below:

Column 32, line 43, Claim 15: Cancel "an first" and substitute --a first--.

Column 34, lines 11 and 12, Claim 17: Cancel "opera- tion" and substitute --operate--.

Signed and Sealed this

Sixteenth Day of June, 2009

JOHN DOLL
*Acting Director of the United States Patent and Trademark Office*